United States Patent
Ruybal et al.

(10) Patent No.: US 10,960,882 B2
(45) Date of Patent: Mar. 30, 2021

(54) METHOD AND SYSTEM FOR CREEP TORQUE CONTROL

(71) Applicant: Ford Global Technologies, LLC, Dearborn, MI (US)

(72) Inventors: Kevin Ray Ruybal, Canton, MI (US); Rajit Johri, Canton, MI (US); Jose Velazquez Alcantar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/444,451

(22) Filed: Jun. 18, 2019

(65) Prior Publication Data

US 2020/0398844 A1    Dec. 24, 2020

(51) Int. Cl.
| | |
|---|---|
| *B60W 30/18* | (2012.01) |
| *B60W 10/08* | (2006.01) |
| *B60W 20/10* | (2016.01) |
| *B60W 10/119* | (2012.01) |
| *B60W 10/18* | (2012.01) |

(52) U.S. Cl.
CPC ...... *B60W 30/18063* (2013.01); *B60W 10/08* (2013.01); *B60W 10/119* (2013.01); *B60W 20/10* (2013.01); *B60W 10/18* (2013.01); *B60W 2710/083* (2013.01)

(58) Field of Classification Search
CPC .......... B60W 30/18063; B60W 10/08; B60W 10/119; B60W 20/10; B60W 10/18; B60W 2710/083
USPC .......................................................... 701/22
See application file for complete search history.

(56) References Cited

U.S. PATENT DOCUMENTS

| | | | |
|---|---|---|---|
| 7,222,011 B2* | 5/2007 | Smith ................. | B60W 10/06 701/51 |
| 9,399,408 B2 | 7/2016 | Jung | |
| 9,475,395 B2* | 10/2016 | Beever ............... | B60K 7/0007 |
| 9,573,579 B2* | 2/2017 | Johri ................... | B60K 6/48 |
| 9,849,879 B2* | 12/2017 | Kelly ................. | B60W 30/143 |
| 9,873,353 B1* | 1/2018 | Yu ...................... | B60L 15/2063 |
| 10,328,942 B2* | 6/2019 | Kelly ................. | B60W 40/068 |
| 2014/0067240 A1* | 3/2014 | Yu ...................... | B60W 40/06 701/112 |
| 2017/0327005 A1* | 11/2017 | Meyer ................ | B60K 6/48 |
| 2019/0299979 A1* | 10/2019 | Sadakiyo ........... | B60W 30/06 |
| 2020/0079373 A1* | 3/2020 | Ortmann ............ | B60W 40/11 |
| 2020/0361303 A1* | 11/2020 | Meyer ................ | B60W 10/08 |

* cited by examiner

*Primary Examiner* — Yazan A Soofi
(74) *Attorney, Agent, or Firm* — David Kelley; McCoy Russell LLP

(57) ABSTRACT

Methods and systems are provided for providing off-road capabilities in electric vehicles with a single gear reduction. In one example, when a 4×4 mode is selected in an electric vehicle, a relationship between motor torque and accelerator pedal position is changed so as to increase the vehicle creep wheel torque. A degree of increase of the creep wheel torque is adjusted as a function of the terrain on which the vehicle is off-roading.

20 Claims, 11 Drawing Sheets

METHOD AND SYSTEM FOR CREEP TORQUE CONTROL

FIELD

The present description relates generally to methods and systems for controlling a creep torque in an electric vehicle to enable brake pedal only driving at low speeds where traction control is required.

BACKGROUND/SUMMARY

Off-road vehicles (ORVs) are configured to drive on a variety of rough terrains. However, there may be instances, when a vehicle driver is trying to slowly cross rough terrain, wherein the vehicle can get stuck. In particular, if the terrain surface is soft or slippery, constant vehicle speed and momentum needs to be maintained to prevent the vehicle from sinking into the ground and getting stuck. Maintaining constant speed may be difficult because of the variable amount of torque needed to follow the changing incline of the terrain. To maintain control, the vehicle would need to descend steep declines very slowly to avoid skidding tires and excessively compressing suspension. As such, this requires precise control of wheel torque in synchrony with the changing terrain.

For example, while operating an off-road vehicle on a terrain with changing grade, there may be instances where negative wheel torque may be needed to prevent the vehicle from quickly sliding down an incline at the front wheels, followed immediately by a need for positive torque for the vehicle to move up an incline. The constant changes in torque magnitude and direction may be challenging to execute because of driveline management (e.g., due to the need for frequent lash crossing, driveline shuffle and excitation). Furthermore, a human driver may be required to physically switch between the gas and brake pedals to smoothly manage the wheel torque while the vehicle body and driver's seat are in motion.

In conventional vehicles that are propelled using engine torque, such maneuvers can be performed by a human driver using a low range 4×4 mode, where available. The driver can recognize changes in terrain that are coming up and preemptively take action and prepare for upcoming obstacles. Further, the conventional powertrain utilizing an internal combustion engine typically uses a transmission with multiple gear ratios to transmit engine torque to the wheels. A four wheel drive (4WD) vehicle (or a vehicle in the 4×4 mode) transmits torque to all four wheels, and may also have an additional set of gears after the output of the transmission that allows the driver to enable an additional torque multiplication gear ratio (known as "low range" or "4×4 Low"). Selection of the 4×4 Low mode increases positive torque and powertrain braking negative torque at the wheels by a factor (e.g., of 10 or more), allowing the vehicle to ascend and descend terrain at lower engine speeds as a result of the lower engine torque required. By multiplying the positive torque produced by the powertrain during creep (that is, when the accelerator pedal is not applied and the engine is at idle speed), the vehicle may have enough torque to climb inclines without the need for any accelerator pedal input or the need for an increase in engine torque. This allows the driver to focus on only modulating the brake pedal during this maneuver (e.g., releasing the brake pedal to accelerate, and applying the brake pedal to decelerate the vehicle). This makes the task of controlling speed relatively easier as there is only a single control input to the system.

However, such torque management may be difficult in electric vehicles as well as autonomous vehicles that do not have a human driver. One example approach for low vehicle speed torque management in an electric vehicle is shown by Johri et al in U.S. Pat. No. 9,573,579. Therein, a torque provided by an electric machine is adjusted in response to a torque converter model while operating the vehicle in a creep mode. The torque converter model provides for a locked or unlocked torque converter clutch on the basis of a virtual torque converter impeller speed, the impeller speed inferred from the operating conditions of a driveline integrated starter generator.

However, the inventors herein have recognized potential issues with such approaches. As one example, the creep wheel torque (that is, torque produced when the accelerator pedal is not applied) for an electric vehicle with a single gear reduction is significantly lower than the wheel torque that results from a low range gear multiplication in a conventional vehicle. As a result, the electric creep torque is not high enough to allow a driver to cross a terrain with frequently changing grades using only a brake pedal. This reduces the off-road drivability of the electric vehicle. While dedicated control software changes may be applied, they make be expensive and complex.

As another example, unlike a conventional engine powered vehicle, an electric vehicle with electric motors driving the front and/or rear wheels (e.g., battery electric vehicle (BEV), hybrid electric vehicle (HEV), or plug-in hybrid electric vehicle (PHEV)) does not require a multispeed transmission and can instead utilize a single gear reduction between the motor and wheels. This reduces the complexity of the drivetrain. However, it also means that there is no longer an option for an additional "Low-range" gear multiplication available to the driver. As a result, low speed driving on a changing terrain may become difficult for the driver to control.

Further, while the approach of '579 adjusts the torque output of the electric machine during vehicle creep, it is meant to provide consistent behavior for a vehicle with a torque converter (locked or unlocked) and a conventional transmission. '579 is also intended to transition between speed control and torque control.

The inventors have recognized, however, that the electric motors of an electric vehicle can be leveraged to precisely generate torque, in particular, maximum torque at very low vehicle speeds. Consequently, there may be more freedom for mapping wheel torque against vehicle speed and accelerator position so as to create different levels of creep torque for the electric vehicle, for example with different mappings of the curve depending on the conditions. The creep torque curve freedom allowed by the electric motors also means that the curve can be customized by and for the driver, such as based on their driving habits and preferences, as well as for the terrain type. In particular, the wheel torque commanded to the electric motors, for a given speed and pedal position, may be increased at low vehicle speeds as to create a virtual low range torque multiplication.

Thus in one example, 4×4 low speed brake pedal driving can be provided, virtually such as with a modified mapping. In one example, in an electric vehicle, a method may comprise: while operating an electric-only vehicle in a low range mode, increasing a creep torque command to one or more electric motors at a given vehicle speed and pedal position relative to a default creep torque commanded when operating the vehicle outside the low range mode; and adjusting a wheel torque command while operating in the low range mode based on at least one of vehicle terrain data and vehicle speed. In this way, driver demanded wheel torque calculations, friction brake coordination algorithms, and other traction control or front/rear torque split features of an electric-only vehicle can be configured to provide brake pedal-only driving at low speeds when significantly more wheel torque than normal creep torque is required to propel the vehicle. As a result, the off-road capability of an electric vehicle is improved.

As an example, upon selection of a "4×4 Low" mode by an operator of an electric-only vehicle, a creep torque profile can be switched from a default creep torque profile to a 4×4 mode profile wherein the maximum creep torque is raised. A degree of increasing the maximum creep torque, and the slope of the creep torque profile, may be adjusted as a function of vehicle terrain data captured via one or more sensors of the vehicle and/or based on input from the vehicle operator. As an example, the creep torque increase may be larger when the vehicle terrain includes gravel versus when the vehicle terrain includes snow. One or more other parameters of the creep torque profile may also be adjusted, such as a peak creep speed (that is, the vehicle speed at which the creep wheel torque crosses from positive to negative), as well as maximum creep torque, and the rate of creep torque reduction when the brake pedal is applied. This enables the vehicle to be controlled via single brake pedal adjustments, with the vehicle accelerated upon release of the brake pedal, and decelerated upon application of the brake pedal. When the virtual 4×4 low speed mode is disengaged, the vehicle controller may resume the default creep torque profile, or apply a blending function to gradually return to the default profile.

In this way, off-road capabilities of an electric vehicle are improved. The technical effect of increasing a creep wheel torque commanded to electric motors of an electric-only vehicle is that brake pedal-only driving may be performed at low vehicle speeds with significantly more wheel torque. Further, the electric vehicle can be driven on terrain with changing grades without requiring complex software changes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
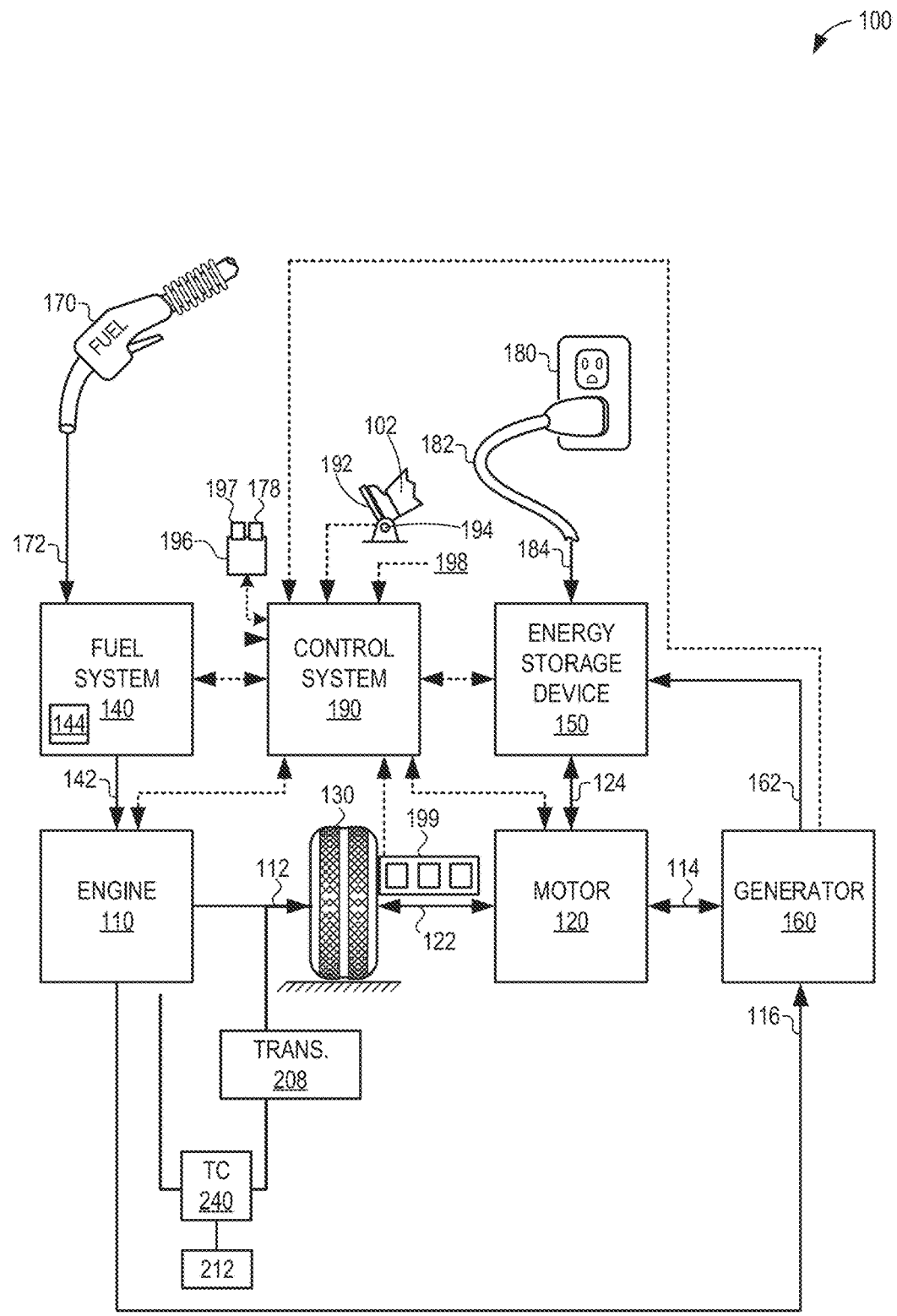
FIG. 1 shows an example hybrid electric vehicle system.
Figure 2A:
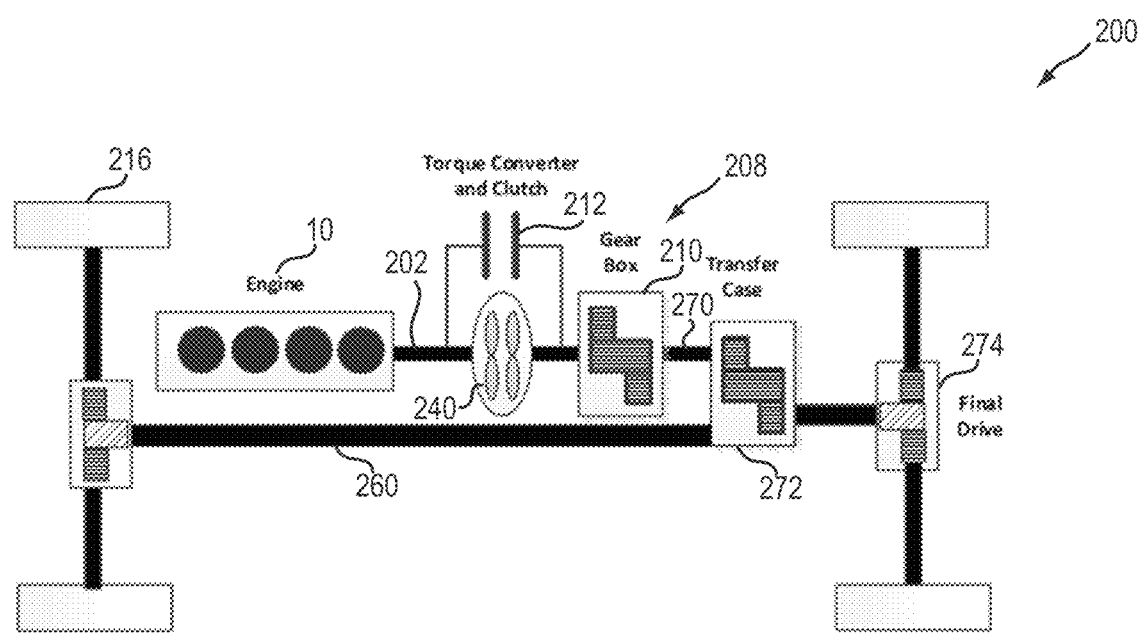
FIGS. 2A-2B compare the powertrain of an engine-only vehicle having 4×4 capabilities with an electric powertrain of an electric-only vehicle.

The following description relates to systems and methods for improving off-road driving capabilities of an electric-only vehicle via powertrain adjustments. An example hybrid vehicle system is shown at FIG. 1. As such, the method described herein may applicable to any powertrain that uses an electric motor to provide torque to the wheels through a fixed gear ratio. This means that it is applicable to hybrid electric vehicles (HEVs) that have an electric motor providing propulsion through a conventional transmission locked into a single gear ratio and locked torque converter, or HEVs that use one or more motors to provide torque to the wheels downstream of the conventional engine and transmission. The approach leverages the ability to adjust a torque output by electric motors of an electric powertrain (FIG. 2B) with high accuracy to provide a virtual 4×4 Low speed functionality available in the powertrain of an engine-only vehicle, such as shown in the powertrain of FIG. 2A. Upon selection of a 4×4 mode in an electric-only vehicle, such as during vehicle operation on a rough terrain (FIG. 3), a vehicle controller may increase the creep torque delivered to vehicle wheels, in accordance with the method of FIG. 4, to enable a driver to cross a terrain with frequently changing grades using only a brake pedal of the vehicle. Example creep torque profiles are disclosed with reference to FIGS. 5, 9, and 10. Resulting interactions between brake pedal position and electric motor torque are shown with reference to the examples of FIGS. 6-7. An example application of the approach is discussed in FIG. 8 in reference to vehicle operation on a changing terrain based on input from various vehicle sensors. An example blending function that may be applied when transitioning out of the 4×4 mode and returning to a default mode of vehicle operation with motor torque is shown at FIG. 11. In this way, an electric vehicle, or a hybrid electric vehicle, can be provided with improved off-roading capabilities.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130, as indicated by arrow 122, while engine 110 is deactivated.

During other operating conditions, engine 110 may be set to a deactivated state (as described above) while motor 120 may be operated to charge energy storage device 150. For example, motor 120 may receive wheel torque from drive wheel 130, as indicated by arrow 122, where the motor may convert the kinetic energy of the vehicle to electrical energy for storage at energy storage device 150, as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150, as indicated by arrow 162.

During still other operating conditions, engine 110 may be operated by combusting fuel received from fuel system 140, as indicated by arrow 142. For example, engine 110 may be operated to propel the vehicle via drive wheel 130, as indicated by arrow 112, while motor 120 is deactivated. During other operating conditions, both engine 110 and motor 120 may each be operated to propel the vehicle via drive wheel 130, as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels, and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120, which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110, as indicated by arrow 142. Still other suitable fuels or fuel blends may be supplied to engine 110, where they may be combusted at the engine to produce an engine output. The engine output may be utilized to propel the vehicle, as indicated by arrow 112 or to recharge energy storage device 150 via motor 120 or generator 160.

Engine 10 is coupled to the vehicle wheels via transmission 208 and torque converter 206. In particular, torque output by the engine is transmitted along an input shaft to an impeller of torque converter 206, which drives a turbine of the torque converter. Torque is then transmitted to transmission 208 along the input shaft, which mechanically couples torque converter 206 to transmission 208. Torque converter 206 includes a torque converter bypass lock-up clutch 212 (TCC) to enable torque transfer. When torque converter lock-up clutch 212 is fully disengaged, torque converter 206 transmits engine torque to transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft of transmission 208.

Alternatively, the torque converter lock-up clutch 212 may be partially engaged, or slipped, thereby enabling the amount of torque directly relayed to the transmission from the engine to be adjusted. Transmission 208 includes a gear box (see FIG. 2A) with a plurality of gear clutches (e.g., gears 1-6, and a forward clutch). The gear clutches may be selectively engaged to propel the vehicle. Torque output from the transmission 208 may in turn be relayed to wheels 130 to propel the vehicle. The multiple gear ratios of the transmission enable a varying amount of engine torque to be transmitted to the wheels to provide a wheel torque that is based on the driver demand, as inferred from operator pedal 192.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from a pedal position sensor 194 that communicates with a pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170, as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198 and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197, which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Vehicle 100 may be a start/stop vehicle wherein engine 110 is configured to be selectively deactivated when idle-stop conditions are met, such as when the vehicle is stopped at a traffic light and torque demand is reduced. At that time, engine fueling may be disabled and the engine may spin to rest. Then, when restart conditions are met, such as when the operator tips in, engine fueling may be resumed and the engine may spin up. The idle-stop operations enable fuel savings, a reduction in vehicle emissions, as well as a reduction in engine noise, vibration, and harshness (NVH).

In some embodiments, vehicle system 100 is an off-road vehicle. As elaborated herein, a mode selection button 178 may be coupled to display 196 to enable a vehicle operator to operate the vehicle system in a mode that enables smooth off-road vehicle propulsion. When selected, based on the configuration of the vehicle, adjustments may be made provide a higher creep wheel torque to enable the vehicle to drive off-road. In addition, a mapping between wheel torque and driver pedal may be adjusted when driving the vehicle in the low range mode to enable single pedal driving where the vehicle is decelerated upon driver depression of a brake pedal, and wherein the vehicle is accelerated upon drive release of the brake pedal.

For example, vehicle system 100 may include an additional gear box coupled between transmission 208 and vehicle wheels 130. Such an additional gear box is typically provided in engine-only vehicles, such as the example powertrain shown in FIG. 2A. The additional gear box may be coupled in the vehicle's driveline, downstream of the transmission and upstream of vehicle wheels. Upon selection of an off-road mode (such as via selection of a "4×4 Low" mode) while propelling the vehicle with engine torque, the additional gear box is coupled to the driveline, such as via actuation of clutch, to enable additional torque multiplication (that is, in addition to what is provided by the existing gear reduction of the transmission). The additional torque multiplication allows for a higher wheel torque to be provided at a given operator pedal displacement, and also allows for a higher creep wheel torque to be provided when the engine is idle and the vehicle speed is less than a threshold (such as at 2 mph or less).

Figure 2B:
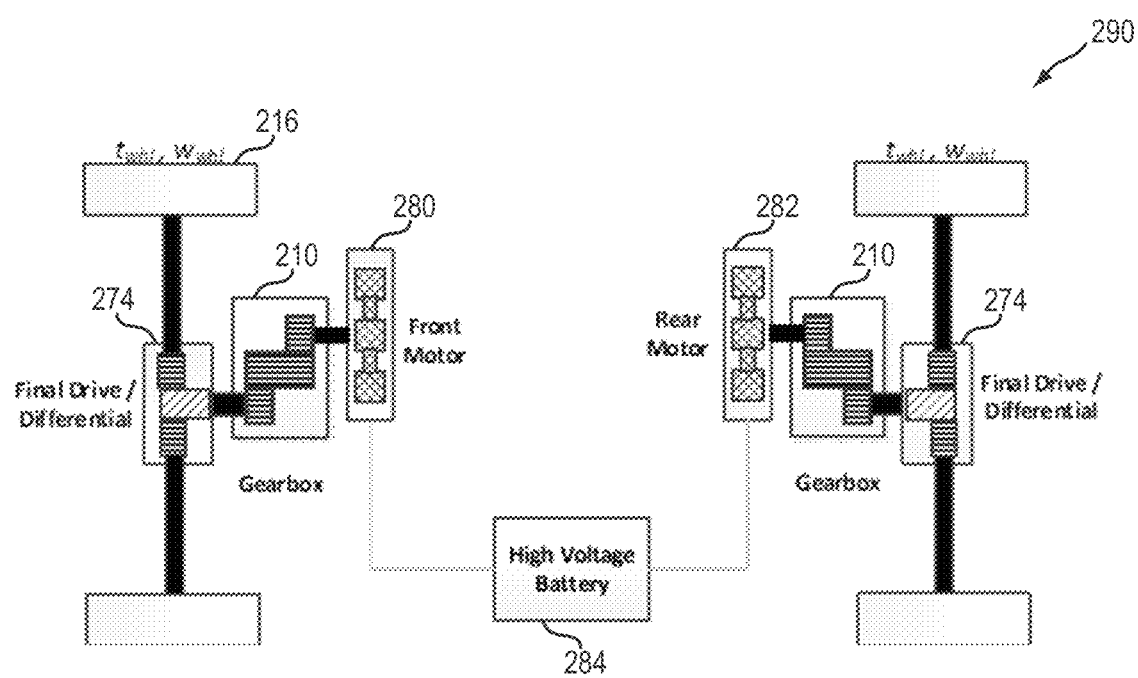

When the vehicle is operated in an electric mode, and propelled with motor torque only (electric mode), a similar torque multiplication is not possible without the presence of an additional gearbox in the driveline between the motor and the vehicle wheels. An example electric vehicle driveline is shown in FIG. 2B and it depicts the typical absence of an additional gearbox between electric motors and the wheels. As such, the additional gearbox may entail additional hardware and associated costs. As elaborated herein, the inventors have developed a method for selecting and providing a creep wheel torque profile for the electric vehicle that allows for torque multiplication while operating at low vehicle speeds. As a result, the function of the additional gear box is provided virtually. An elevated torque profile that maps wheel torque to a combination of vehicle speed, brake pedal input, and accelerator pedal input to meet the demands of a changing terrain is selected, and then torque is distributed and commanded to the available electric motor(s) of the electric driveline to deliver that wheel torque. Such a torque profile selection improves the off-road performance of an electric vehicle by providing the torque multiplication benefits of an additional gearbox in the 4×4 mode without requiring the associated hardware.

Control system 190 receives information from a plurality of sensors and sends control signals to a plurality of actuators. The plurality of sensors may include, for example, vehicle sensors 199, ambient humidity sensor 198, refueling button 197, pedal position sensor 194, mode selection button 178, etc. The plurality of actuators may include fuel injectors, motor 120, etc. The control system 190 may include a controller that receives input data from the various sensors, processes the input data, and triggers the actuators in response to the processed input data based on instruction or code programmed therein corresponding to one or more routines. An example control routine is described herein with regard to FIG. 3. In this way, the controller receives signals from the various sensors and employs the various actuators to adjust engine operation based on the received signals and instructions stored on a memory of the controller. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Controller 12 may also control torque output and electrical energy production by adjusting current flowing to and from motor 120.

In one example, the vehicle of FIGS. 1-2B are off-road vehicles configured for driving of varying terrain, such as gravel, sand, snow, etc. For such off-road vehicles, there may be many instances in which the driver is trying to slowly cross rough terrain. If the surface is soft or slippery, constant vehicle speed and momentum needs to be maintained to avoid sinking into the ground and getting stuck. Maintaining constant speed may be difficult because of the variable amount of torque needed to follow the changing incline. To maintain control of the vehicle, the truck should very slowly descend steep declines to avoid skidding tires and excessively compressing suspension, which requires precise control of wheel torque synchronized with the changing terrain.

Figure 3:
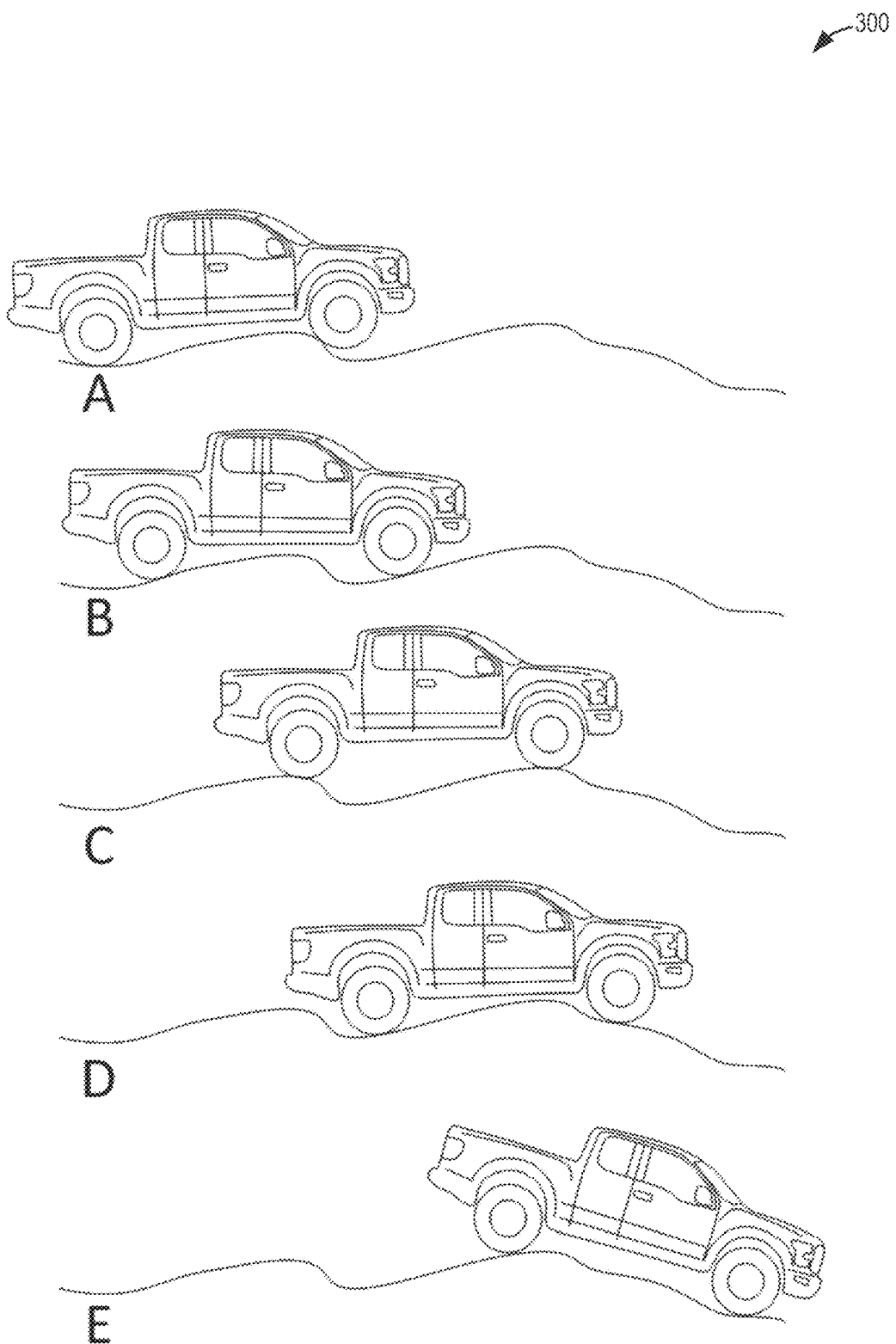
FIG. 3 depicts an off-road vehicle operating on a rough terrain having frequently changing grade.

For example, FIG. 3 shows an off-road vehicle being propelled along a rough terrain of varying grade. This presents a challenging situation for accurately controlling a constant, slow vehicle speed. When the vehicle is in position A, some negative wheel torque is needed to prevent the vehicle from quickly sliding down the incline at the front wheels. This is immediately followed in position B by a need for significant positive torque (that is, more than normal accelerator creep torque) for the vehicle to move up the incline. Next, in position C, significant negative wheel torque is immediately needed to prevent both tires from sliding down the incline. In position D, a balance of negative and positive wheel torque is needed to maintain speed until both axles cross over the last peak. Then, in position E, negative wheel torque is once again needed to retard vehicle acceleration down the decline due to gravity.

The constant changes in torque magnitude and direction are challenging to execute because of driveline management. For example, they may result in frequent lash crossing, driveline shuffle and excitation. As a result, a human driver of the vehicle is required to, frequently, physically switch between the gas and brake pedals to smoothly manage torque while the vehicle body and driver's seat are in motion.

In a conventional fuel-powered vehicle having an internal combustion engine for generating wheel torque, such a maneuver can be performed more easily by the driver via enablement of a low range 4×4 mode (also referred to as "4×4 Low), if available. The driver has an advantage over a traditional, automated slow speed control algorithm because the human can recognize changes in terrain that are coming and preemptively take action and prepare for upcoming obstacles, such as in position C in FIG. 3.

The powertrain of such a conventional vehicle utilizing an internal combustion engine is shown at FIG. 2A. Therein, driveline 202 is powered by engine 10, such as engine 110 of FIG. 1. Torque of engine 10 may be adjusted via a torque actuator, such as a fuel injector, throttle, etc. An engine output is transmitted to an impeller of a torque converter 206. Torque converter 206 includes a turbine to output torque to an input shaft, which in turn mechanically couples torque converter 206 to a transmission 208. Torque converter 206 also includes a torque converter bypass lock-up clutch 212 (TCC). Torque is directly transferred from the impeller to the turbine of the torque converter when TCC 212 is locked. TCC is electrically operated by a vehicle controller. Alternatively, TCC may be hydraulically locked. In one example, the torque converter may be referred to as a component of the transmission 208. When torque converter lock-up clutch 212 is fully disengaged, torque converter 206 transmits engine torque to transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request. Automatic transmission 208 includes a gear box 210 with a plurality of gears and gear clutches (e.g., gears 1-6, and a forward clutch). The gear clutches may be selectively engaged to propel the vehicle. Torque output from the transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216 via final drive/differential 274. The multiple gear ratios of the transmission enable a varying amount of engine torque to be transmitted to the wheels.

A frictional force may be applied to wheels 216 by engaging wheel brakes in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 via the controller (such as controller 12 of FIG. 1) as part of an automated engine stopping procedure.

When drivetrain 200 is coupled in a four wheel drive (4WD) vehicle, the output torque is transmitted to all four wheels (in comparison to transmitting torque only to front wheels in a two wheel drive, 2WD, vehicle). Therein, drivetrain 200 may have an additional set of gears, transfer case 172, after the output of the transmission that allows the driver to enable an additional torque multiplication gear ratio (known as "low range" or 4×4 Low). Selecting 4×4 Low increases positive torque and powertrain braking negative torque at the wheels by a factor, such as by a factor of 10 or more, allowing the vehicle to ascend and descend terrain at lower engine speeds as a result of the lower engine torque required. By multiplying the positive torque produced by the powertrain during creep (that is, when the accelerator pedal is not applied and engine is at idle speed), the vehicle may have enough torque to climb inclines without any accelerator pedal input or need to increase engine torque. Thus, the use of an additional gear multiplication 172 significantly increases the wheel torque produced by the engine at idle, providing a constant, large positive torque to the wheels that the driver can regulate with friction brake application. This allows the driver to focus on only modulating the brake pedal during this maneuver, including releasing the brake to accelerate the vehicle and applying the brake to decelerate the vehicle. This makes the task of controlling speed easier as there is only a single control input to the system.

Unlike a conventional vehicle, however, a vehicle with electric motor(s) driving the front and/or rear wheels (e.g., battery electric vehicle (BEV), hybrid electric vehicle (HEV), or plug-in hybrid electric vehicle (PHEV)) does not require a multispeed transmission and can instead utilize a single gear reduction between the motor and wheels. The powertrain 290 of such an electric vehicle is shown at FIG. 2B, with components previously introduced numbered similarly. As shown, front and rear motors 280, 282, are powered using electrical power drawn from a high voltage battery 284. The motor torque from the motors is delivered to the wheels via a final drive/differential 274. However, only a single gear reduction 210 is required between the motor and the differential. This reduces the complexity of the powertrain 290, but it also means that there is no longer an option for an additional "Low-range" gear multiplication available to the driver.

Thus, a conventional vehicle with a 4×4 low range transfer case allows the driver to precisely control vehicle speed using only the brake pedal at low vehicle speeds in situations where significant wheel torque is required (e.g., on steep grade, heavy trailer, rough terrains, etc.). This type of behavior is very desirable and commonly used by truck owners. In comparison, a BEV that does not have a multispeed gearbox is not able to perform this type of operation without special control software changes.

In the powertrain architecture of FIG. 2A, which transmits torque from the engine to the driveline through a torque converter, in the 4×4 mode, the driver is not applying the accelerator pedal, but instead only uses the brake pedal as the input. The engine idle speed controller maintains a constant engine speed, and the difference in speed between the torque converter's input (impeller) and output (turbine) provides torque to the wheels through a total gear reduction (e.g., a gear reduction of 45:1 accounting for the transmission, the low range gear, and the final drive ratio). This allows for calculation of a wheel torque that the conventional vehicle would produce as a function of vehicle speed.

The inventors herein have recognized that the 4WD electric powertrain shown in FIG. 2B has many features that can be leveraged for low-speed, off-road driving, so that a vehicle operator can drive an electric vehicle on rough terrain using brake pedal only driving, as in the case of a conventional vehicle. In particular, electric motors (such as front and rear motors 280, 282) can precisely generate maximum torque at very low vehicle speeds. Further, there is a lot of freedom for mapping the wheel torque against vehicle speed and accelerator position based on defined constraints and limits.

Figure 5:
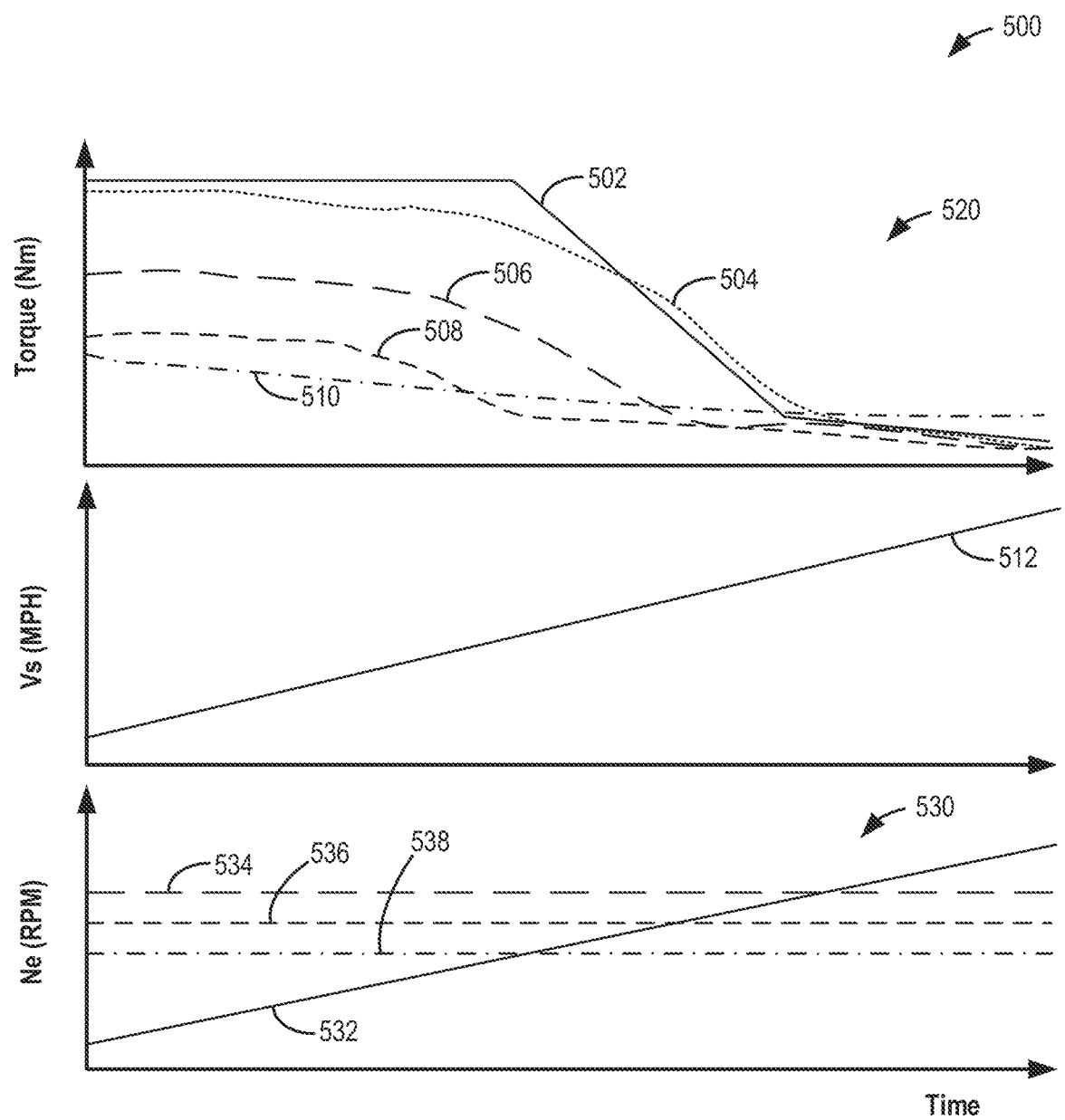
FIG. 5 depicts example changes in wheel torque with vehicle speed.

FIG. 5 shows a simulation using example torque converter characteristics and different engine idle speed targets. Map 500 depicts wheel torques at graph 520 wherein plot 510 (dashed and dotted line) depicts a default creep wheel torque for an electric-only (BEV) vehicle. This is compared to creep wheel torque for an engine propelled vehicle at idling speeds of 600, 800, and 1000 rpm, at plots 508, 506, and 504, respectively. The idling speeds reflect higher than default idling speeds enabled by the use of an additional gear multiplication (4×4 Low) in a conventional engine powered vehicle. A higher engine idling speed target produces a higher wheel torque curve to the wheels. Vehicle speed is shown at plot 512.

The plots of FIG. 5 were generated, for example, by sweeping vehicle speed from 0 to a speed at which turbine speed would be above the highest engine idle speed to show how wheel torque would react to increasing vehicle speed for all cases. Because vehicle speed is directed along an increasing linear ramp in the simulation, the vehicle speed and resulting wheel torque curves are smooth and directly comparable to each other.

Engine idling speeds are compared to a torque converter speed at graph 530. Therein idling speeds of 600, 800, and 1000 rpm, at plots 538, 536, and 534 are compared to a torque converter turbine speed at plot 532. As can be seen, the torque converter naturally provides a smooth curve that crosses from positive to negative when the torque converter's turbine speed exceeds the impeller speed. This will cause the system to act as a speed controller by not providing positive torque to accelerate beyond that speed on flat ground. This is due to the ability of the torque converter to only transmit torque in the direction from the fastest side to the slower side, with the magnitude of torque proportionally increasing when there is a larger magnitude of speed difference from one side to the other. As shown in the figure, each idle speed produces the largest amount of wheel torque while the vehicle is stopped and the largest speed difference between the impeller and turbine is achieved. The torque achieved is smoothly reduced and the turbine speed approaches the impeller speed, and the torque changes sign to the negative direction once turbine speed exceed the impeller speed and becomes the faster side of the torque converter. This behavior will naturally reduce acceleration as the vehicle approaches the maximum creep speed, and continue to produce negative torque decelerate vehicle as it exceeds the maximum creep speed.

Figure 9:
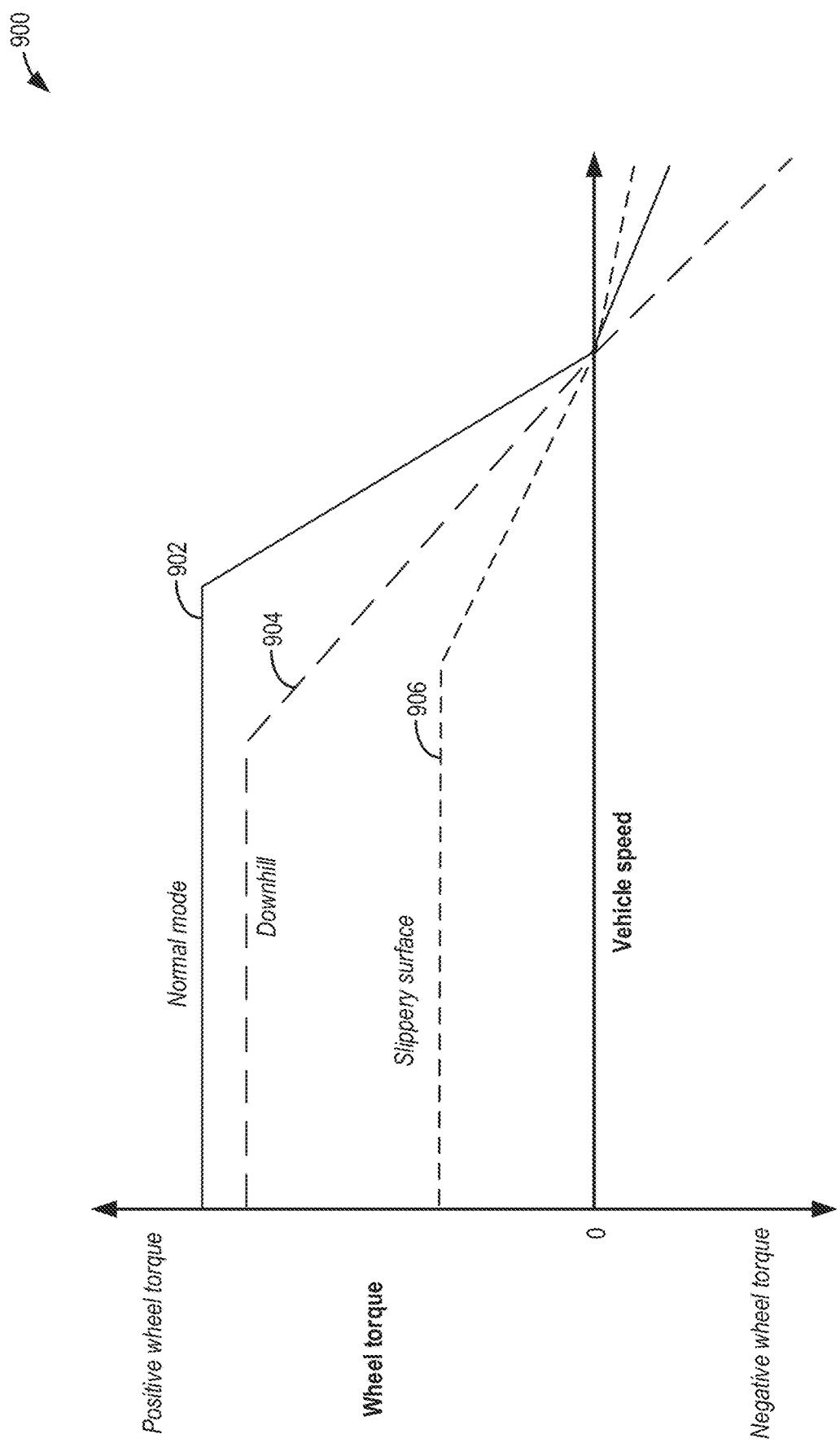
FIG. 9 depicts example creep torque maps for different terrain settings.

Turning transiently to FIG. 9, map 900 shows an example of different creep torque maps 902-906 for different terrain settings. A "normal" of default curve is shown at plot 902 and demonstrates the nominal BEV creep torque behavior (as shown in FIG. 5). When a slippery surface (such as sand or snow) is detected or indicated by the driver, creep torque behavior is transitioned to the curve of plot 904 wherein the peak creep torque is reduced to prevent wheel spin as the driver lifts off the brakes. Additionally, torque is tapered off more gradually as speed increases (see the shallower slope of plot 904 relative to plot 902) and the amount of negative torque is reduced at speeds above creep speed to produce more gentle applications of torque.

If downhill conditions are detected or indicated by the driver, creep torque behavior is transitioned to the curve of plot 906 wherein an additional creep map could reduce the torque across all vehicle speeds to account for the additional acceleration that comes from gravity. Also, the amount of negative torque can also be increased to account for the extra effort that would be required to slow the vehicle down and maintain speed.

Returning to FIG. 5, plot 510 illustrates that the default creep wheel torque, produced when the accelerator pedal is not applied, for an electric vehicle with a single gear reduction is much lower than the wheel torque than that which results from a conventional vehicle's low range gear multiplication. In other words, the normal electric creep torque would not be high enough to allow the driver to cross the example terrain using only the brake pedal. In one example, the default creep wheel torque is 3000 Nm.

To simulate the desired gear multiplication, which is not available due to the absence of a low range gear reduction in the electric-only vehicle, the wheel torque commanded to the electric motors can be increased at low speeds to create a "Virtual Low Range" torque multiplication. The conventional vehicle's torque curve is directly a function of the torque converter slip and vehicle speed, so it can only be adjusted by changing engine speed which is typically tied to accelerator pedal position. Since there is nothing directly correlating vehicle speed and electric motor torque at low vehicle speeds, a controller can create any desired torque profile.

One example simulated low range creep torque profile is shown at plot 502 (solid line) in graph 520. The creep wheel torque profile represented by plot 502 maintains the constant wheel torque equal to the conventional vehicle, then linearly decreases the wheel torque to provide a maximum creep speed of 2 MPH on flat ground. This curve would provide the same brake-pedal driving experience as the conventional vehicle. If the driver does press the accelerator pedal, the desired wheel torque would proportionally increase to allow the driver to request more wheel torque to climb obstacles if the elevated creep torque alone is not sufficient.

Figure 4:
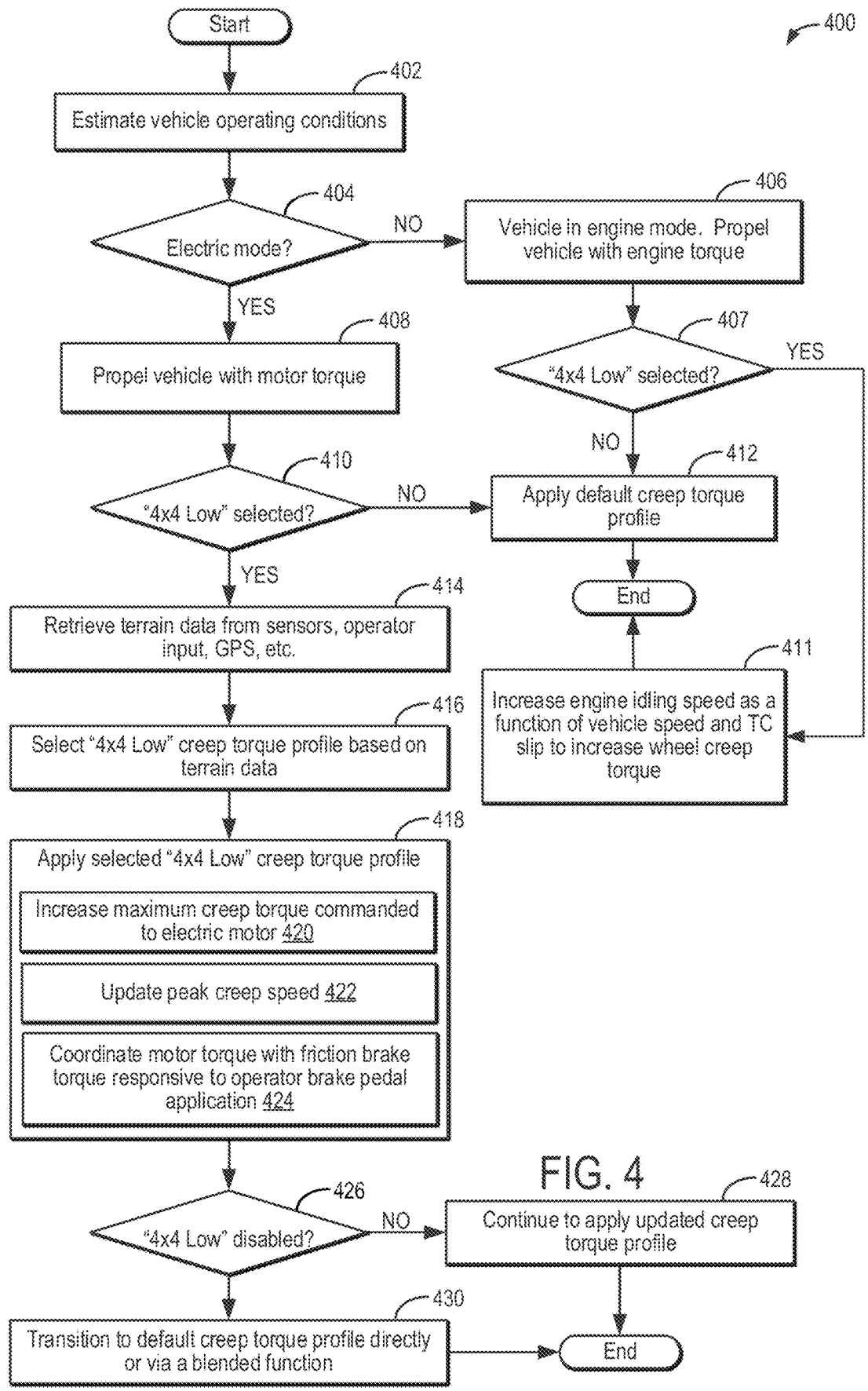
FIG. 4 shows an example method for adjusting a creep torque of an electric-only vehicle in a 4×4 Low mode to provide brake pedal-only driving capabilities.

Inventors have recognized that distinct creep wheel torque profiles, such as profiles 504-510, or those with higher wheel torque values at a given vehicle speed, can be generated for an electric vehicle. These maps can be generated, calibrated, and stored in the controller's memory as a function of minimum wheel torque required to travel on specific terrains, such as when travelling on snow, or sand, or gravel. During electric vehicle travel, a controller may retrieve one of the profiles based on the operator selection of a low range mode, and further based on indication regarding the kind of terrain the vehicle is traveling on in the low range mode. Then, a command delivered to electric motors of the powertrain can be adjusted to deliver a corresponding wheel torque. Turning now to FIG. 4, an example method 400 is shown for adjusting creep wheel torque in a vehicle based on a selected mode of vehicle operation. The method enables an off-roading capability of the vehicle to be improved. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

It will be appreciated that method of FIG. 4 may be applicable to both hybrid vehicles (such as HEVs) and electric-only vehicles (such as BEVs). A controller may also provide the "virtual low range" increased creep torque in a conventional or HEV vehicle that utilizes a torque converter by simply increasing the base engine idle speed. However, such an approach may have NVH or efficiency limitations.

At 402, the method includes estimating and/or measuring vehicle operating conditions such as vehicle speed, driver torque demand, ambient conditions (such as ambient temperature, pressure, and humidity), etc. At 404, it may be determined if an electric mode of vehicle operation is selected. In one example, where the vehicle is a hybrid vehicle, the electric mode of vehicle operation may be selected over the engine mode of operation based on driver demand and battery state of charge. For example, when the driver demand is higher than a threshold, the engine mode may be selected. Else, the electric mode may be selected. As another example, the electric mode may be selected only if the state of charge of a battery powering the electric motors is higher than a threshold charge level. If in the electric mode, at 408, the vehicle is being propelled with motor torque generated by electric motor(s) of the vehicle's powertrain. The electric motors may be operated using power drawn from the system battery.

If the vehicle is not being operated in the electric mode, then at 406, the hybrid vehicle may be operated in the engine mode where the vehicle is propelled using engine torque, the engine combusting fuel. While in the engine mode, at 407, it may be determined if a "4×4 Low" button has been actuated or selected, indicating the operator's desire to propel the vehicle off-road. If not, then at 412, the method includes operating the engine with a default creep torque profile. This includes maintaining a default engine idling speed while operating the vehicle. Else, if the 4×4 Low mode is selected, then at 411, the method includes raising the engine idling speed so that a higher creep wheel torque can be provided at lower vehicle speeds. The increase in engine idling speed may be a function of the driver torque demand or requested vehicle speed, as inferred from the accelerator pedal position. In addition, the increase may be a function of a torque converter slip. Thus, varying levels of creep wheel torque may be provided during the off-road vehicle travel by adjusting the engine idling speed.

Returning to 408, while propelling the vehicle using motor torque, the method moves to 410 to determine if the 4×4 Low mode has been selected. In one example, the 4×4 mode is selected by the vehicle operator by actuating a 4×4 button on a vehicle dashboard or a display. If the 4×4 Low mode is not selected, then at 412, the method includes applying a default creep torque profile. This includes operating the electric motors to provide a default wheel creep torque, such as a torque of 3000 Nm, as shown with reference to plot 510 of FIG. 5. The default creep wheel torque may enable the vehicle creep speed to be limited to a defined value, such as to 2 mph.

The default creep torque profile may include a first mapped relationship between creep wheel torque and each of accelerator pedal position and vehicle speed. For example, at a given vehicle speed below a threshold vehicle speed (such as while at or below a maximum creep speed), for a given accelerator pedal position, there may be a mapped amount of wheel torque to be delivered via a corresponding motor torque command to the electric motors. As such, this first mapped relationship may be a smaller mapping (with a smaller gain value) as compared to any of the creep torque profiles applied when operating in the 4×4 mode.

In addition, while outside of the 4×4 mode, the controller may apply a default wheel torque profile including a first mapped relationship between wheel torque delivered as a function of each of accelerator pedal position and vehicle speed. Therein, at a given vehicle speed above the creep speed, and for a given accelerator pedal position, there may be a mapped amount of wheel torque to be delivered via a corresponding motor torque command to the electric motors. As such, this first mapped relationship of wheel torque may be a smaller mapping (with a smaller gain value) as compared to any of the wheel torque profiles applied when operating in the 4×4 mode.

If the 4×4 Low button has been selected, the controller infers that the operator intends to off-road drive the vehicle on a rugged terrain. At 414, the method includes retrieving terrain data. The terrain data may be inferred based on input from sensors, cameras, and radars of the vehicle, such as those described with reference to FIG. 8 and others. For example, the inputs may be used to infer the topography of the terrain, the nature of the track on which the vehicle will be driven (e.g., snow or sand or gravel, etc.), track grade, presence of obstacles, etc. Terrain data may be additionally or alternatively retrieved from a navigation system of the vehicle, such as from GPS data.

At 416, the method includes selecting a 4×4 Low creep torque profile based on terrain data. For example, a creep torque profile may be selected that provides a minimum wheel creep torque to propel the vehicle on the identified terrain. As an example, the controller may select from between the creep torque profiles 504-508 of FIG. 5 based on the terrain data.

In still other examples, the selection of a terrain and a 4×4 Low range mode may be automatically made based on operator indication of the terrain, as received via an operator's mode selection. For example, the operator may select from between a sand mode, a snow mode, a "baj a" mode (indicative of rough terrain), etc., on a vehicle display (or via corresponding buttons on the dashboard) and the controller may infer from the mode selection that the operator intends to off-road the vehicle on the selected terrain. Accordingly, a wheel torque profile may be selected.

Applying the selected creep torque profile includes increasing the maximum creep torque (which may be a maximum positive or a maximum negative motor torque) commanded to the electric motors of the vehicle at 420. Further, at 422, the peak creep speed may be updated. As used herein, the peak creep speed may refer to the vehicle speed at which the creep wheel torque crosses from positive to negative. As the creep wheel torque and maximum motor torque gets higher on the positive side, peak speed increases to a higher speed value. At 424, the controller may coordinate the motor torque from the electric motors with the friction brake torque responsive to brake pedal application.

For example, the creep torque profile selected for vehicle operation on sand may provide a lower maximum creep torque as compared to vehicle operation on gravel. As another example, the controller may select a torque profile from the example map of FIG. 9 based on sensed or driver indicated terrain conditions.

The creep torque profile selected for operating in the 4×4 mode on a given vehicle terrain may be selected from a plurality of available 4×4 creep wheel torque profiles, each distinct from the default creep torque profile, and each including a higher creep torque speed at each position pf the map. For example, a first of the plurality of creep torque profiles may include a second mapped relationship between creep wheel torque and each of accelerator pedal position and vehicle speed wherein at a given vehicle speed below a threshold vehicle speed (such as while at or below the maximum creep speed), for a given accelerator pedal position, there may be a second mapped amount of wheel torque to be delivered via a corresponding motor torque command to the electric motors. As such, this second mapped relationship may be a higher mapping (with a higher gain value) as compared to the default creep torque profile applied when not operating in the 4×4 mode. Further, a second of the plurality of creep torque profiles may include a third mapped relationship between creep wheel torque and each of accelerator pedal position and vehicle speed wherein at a given vehicle speed below a threshold vehicle speed (such as while at or below the maximum creep speed), for the given accelerator pedal position, there may be a third mapped amount of wheel torque to be delivered via a corresponding motor torque command to the electric motors. As such, this third mapped relationship may be a higher mapping (with a higher gain value) as compared to the default creep torque profile applied when not operating in the 4×4 mode, but may be higher or lower than the second mapped relationship, based on the terrain setting corresponding to the second mapped relationship versus the third mapped relationship.

Likewise, while in the 4×4 mode, the controller may apply a wheel torque profile selected from a plurality of wheel torque profiles, each including a mapped relationship between wheel torque delivered as a function of each of accelerator pedal position and vehicle speed that is higher than the first mapped relationship of the default wheel torque profile (applied when not in the 4×4 mode). For each of those plurality of wheel torque profiles, at a given vehicle speed above the creep speed, and for a given accelerator pedal position, there may be a mapped amount of wheel torque to be delivered via a corresponding motor torque command to the electric motors which is higher than the first mapped relationship of wheel torque of the default profile. Further, the mapped relationship for the plurality of torque profiles may be higher or lower relative to each other based on the terrain they correspond to, such as shown with reference to the maps of FIG. 10.

Figure 10:
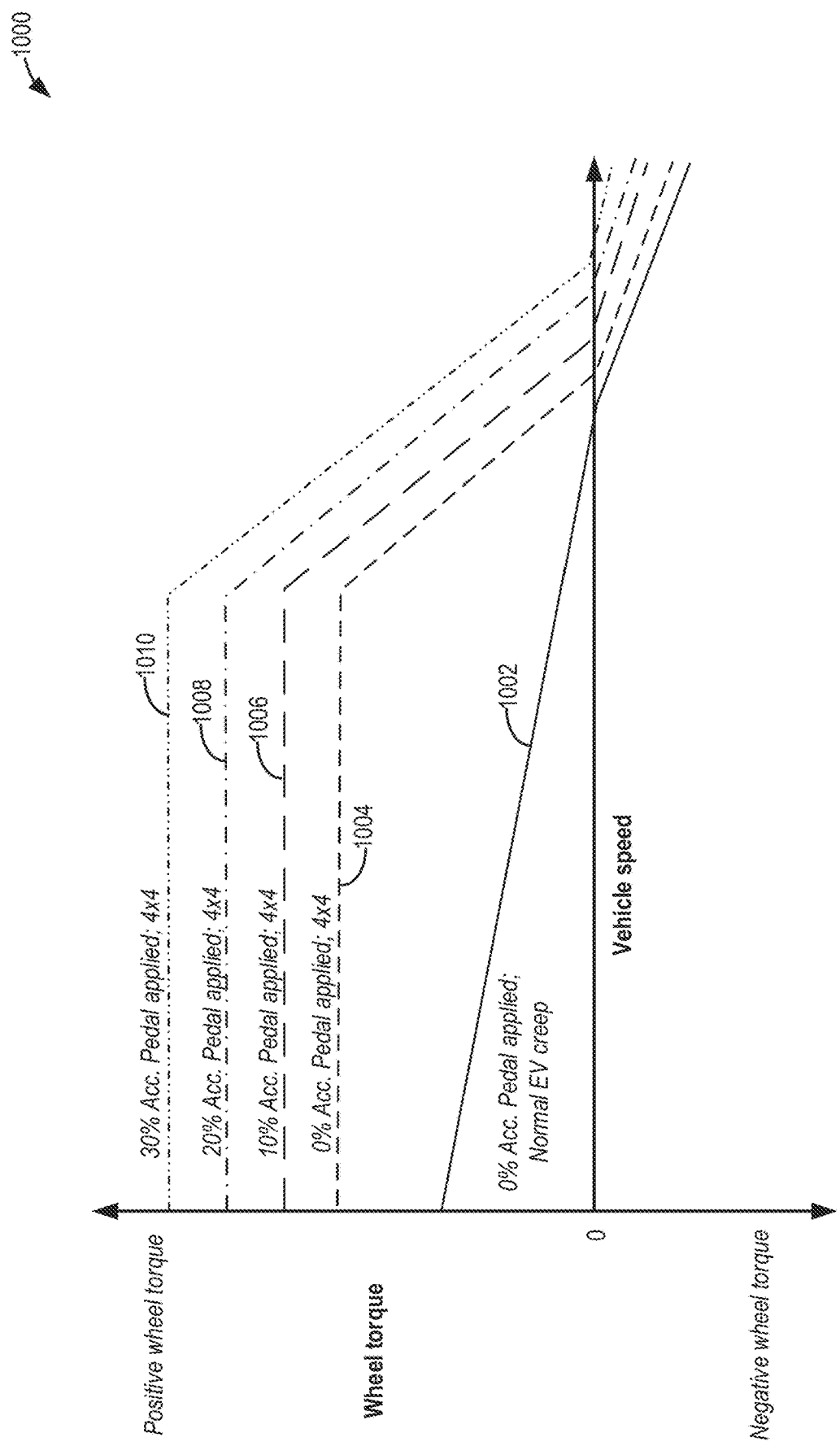
FIG. 10 depicts example creep torque profiles that may be applied while in a 4×4 mode as a function of accelerator pedal application.
Figure 11:
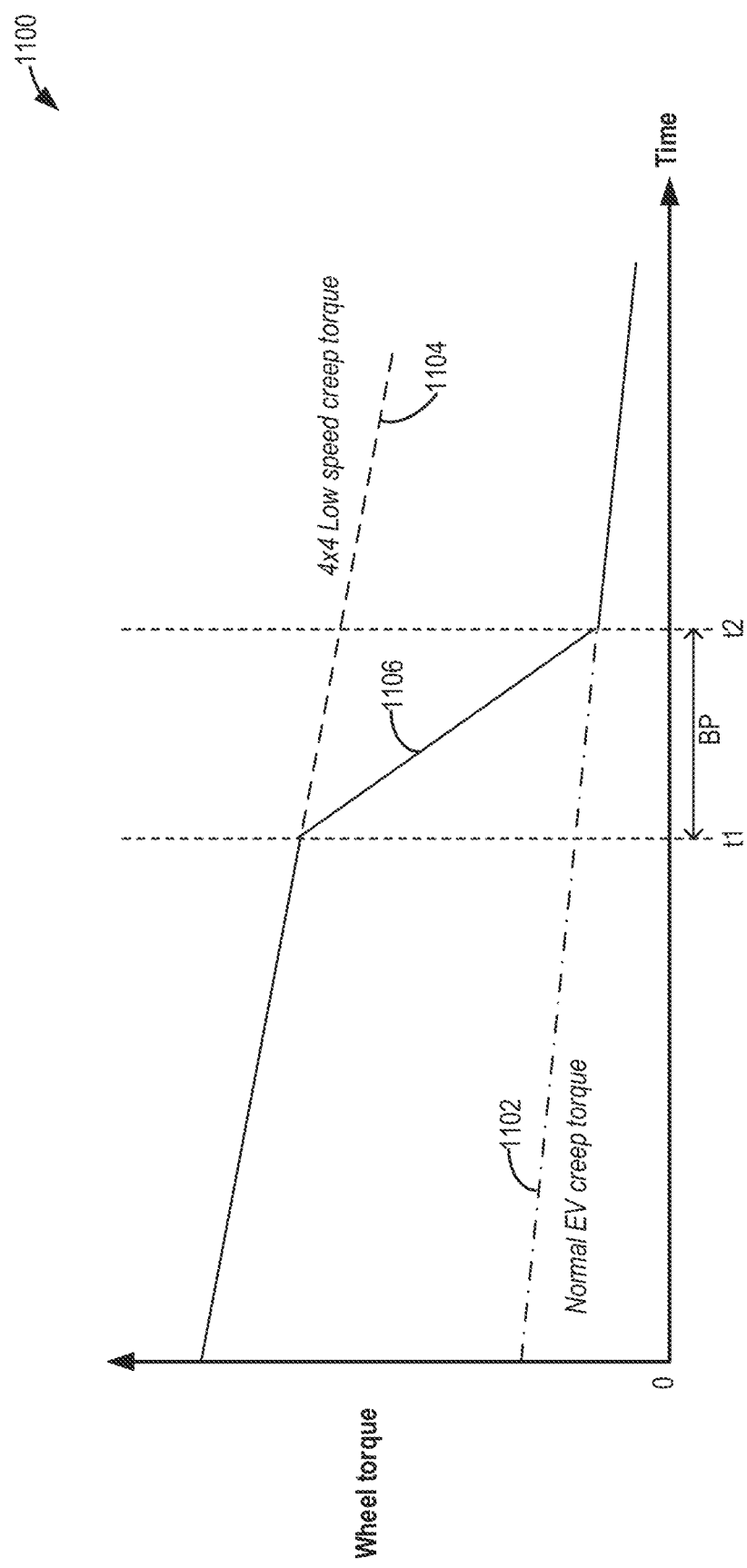
FIG. 11 depicts an example blending profile applied when transitioning out of a 4×4 mode.

Turning briefly to FIG. 10, map 1000 depicts a default EV creep torque profile at plot 1002. Plots 1004 to 1010 depicts example EV creep torque profiles when operating in the 4×4 mode with different levels of accelerator pedal application. As can be seen by comparing the plots, the peak creep wheel torque is higher in any of the 4×4 modes as compared to the default EV mode. In addition, the peak wheel torque increases at higher pedal application and tapers differently as vehicle speed increases.

At 426, it may be determined if the 4×4 Low mode has been disabled, such as when the button is disabled by the vehicle operator, or when a default mode of operation is selected. If not, then at 428, the method includes continuing to operate the vehicle with the updated creep torque profile. The method then exits. Else, at 430, when the virtual 4×4 low speed mode is disengaged or disabled, the vehicle controller may directly transition back to the default creep torque profile, or apply a blending function to gradually return to the default profile.

The blending function may be accomplished in various ways. As one example, when the 4×4 low speed mode is disabled, the controller can simultaneously compute the 4×4 low speed creep torque and the normal creep torque by applying the current vehicle speed and pedal positions to both creep torque profiles. The final applied creep torque values could be a value that linearly progresses from the 4×4 low speed profile to the normal profile over a fixed time interval. An example of such a transition is shown at map 1100 of FIG. 11.

Turning briefly to FIG. 11, map 1100 depicts a 4×4 low speed creep torque profile at plot 1102 and an EV default or normal mode creep torque profile (when not in 4×4 mode) at plot 1104. An actual applied creep torque profile is shown at plot 1106. Wheel torque is shown along the y-axis over time along the x-axis.

Prior to t1, the vehicle is in an EV 4×4 low speed mode and is operating with an applied creep torque profile that matches the 4×4 low speed creep torque profile. At t1, the 4×4 mode is disabled. Over a duration from t1 to t2, defined herein as the blending period (BP), the applied creep torque profile is gradually adjusted from the profile matching the 4×4 low speed creep torque profile (shown at plot 1104) to the profile matching the default EV creep torque profile (shown at plot 1102).

As such, distinct creep wheel torque profiles can be generated for an electric vehicle to meet the torque demand by taking advantage of the electric motors of the electric vehicle to deliver the maximum powertrain torque at low speeds. The increased torque capability allows a maximum amount of freedom to create many different levels of creep torque for the electric vehicle. The creep torque curve freedom allowed by the electric motors also means that the curve can be customized by the driver. For example, the vehicle control system can switch from the default wheel creep torque profile (plot 510 of FIG. 5) to a new profile (e.g., plot 502 of FIG. 5) based on driver input, such as actuation of a "4×4 Low" push button or menu selection. The curve can be further modified by reducing or increasing the maximum creep torque value (e.g., 3000 Nm in the example above). For example, the driver could directly specify the value through menu options, the accelerator pedal could be used to increase from a nominal value (similar to the accelerator pedal increasing engine speed in a conventional vehicle), or the peak could be set based on the type of terrain the vehicle is on (e.g., driver selected or inferred automatically from other inputs). For example, peak creep torque can be reduced if the control system determines that the vehicle is on snow versus gravel. Another variable is the peak creep speed, or the vehicle speed at which the creep wheel torque crosses from positive to negative. This could also be adjusted automatically or by the driver. Since any change to the creep torque profile may result in a step change in motor torque, changes may be limited to conditions with the vehicle stopped before the changes are applied. When the virtual 4×4 low range mode is no longer desired, either the vehicle should be stopped and the "4×4 Low" mode can be disengaged, or there can be a blending function that would return the vehicle to normal operation if the mode is disengaged while the vehicle is moving.

In some examples, when the 4×4 Low mode is enabled, the controller may replace a driver demand creep torque table stored in the controller's memory with a torque converter model that runs online to calculate a wheel torque command for the electric motors that would emulate the behavior of a torque converter in a conventional vehicle. This would produce a creep curve similar to the conventional vehicle curves shown in FIG. 5. Such a model could determine the fictitious engine idle speed input into the model based on driver input, wheel slip detection, type of terrain, accelerator pedal position, etc. As a result, good drivability can be provided, however, the 4×4 Low mode would need to be engaged and disengaged while the vehicle is stationary to avoid a step change in wheel torque request when completely changing the calculation method for driver demand.

In a conventional vehicle that it is creeping, applying the brake pedal is directly proportional to the friction brake torque applied. If the engine is controlled to a constant speed, the engine will consume more fuel when the brake pedal is applied because it is assumed that applying the friction brake torque will decelerate the vehicle and increase the slip speed across the torque converter and apply more load on the engine. This additional fuel is wasted because the driver is trying to slow the vehicle and the additional engine torque is counterproductive. However, this additional engine torque keeps the driveline on the positive side of lash, and allows for a smoother transition back to acceleration when the brake pedal is released. For this reason, when a creep torque profile is selected in the electric mode, the controller may maintain some level of friction brake use during low speed operation for the electric vehicle. However, the electric vehicle has an opportunity to further increase system efficiency when the brake pedal is applied while still providing smooth drivability by coordinating the friction brakes and motor torque, as elaborated below at FIGS. 6-7.

In one example, an existing driver demand table may be calibrated to provide the desired wheel torque vs vehicle speed profile for each terrain. For example, the normal/default EV mode table used to determine desired wheel torque based on vehicle speed and accelerator pedal position can be configured to provide this desired functionality. It may be possible for multiple maps to be calibrated and stored in the controller's memory. When the 4×4 low speed mode is engaged and a specific terrain is indicated, a map calibration can be loaded that provides the target behavior. The calibration for each map can be computed offline by converting the vehicle speed axis of the table to a virtual turbine speed that can be combined with an assumed virtual engine idle speed and torque converter characteristics to generate the table. Alternatively, each map could be calibrated manually by calibration engineers to provide desirable behavior for each condition.

In this way, a new pedal map can be provided for an electric vehicle that is calibrated to provide off-roading capabilities while also being more efficient than a default pedal map. The controller may be configured with code that is executed to coordinate friction brakes with electric motor torque to maintain driveline twist and lash for the vehicle travelling in the forward direction, which cannot be accomplished with current EV brake control hardware or software. Together, the adjusted wheel torque profile in the off-roading mode enables "one pedal" driving using the brake pedal at low speeds.

It will be appreciated that while the virtual 4×4 low mode is provided to configure driver demand wheel torque calculations, and friction brake coordination, still other forms of traction control and/or front/rear torque split features can be adjusted to provide brake pedal only driving at low speeds when significantly more wheel torque than normal creep is required to move the vehicle.

Figure 6:
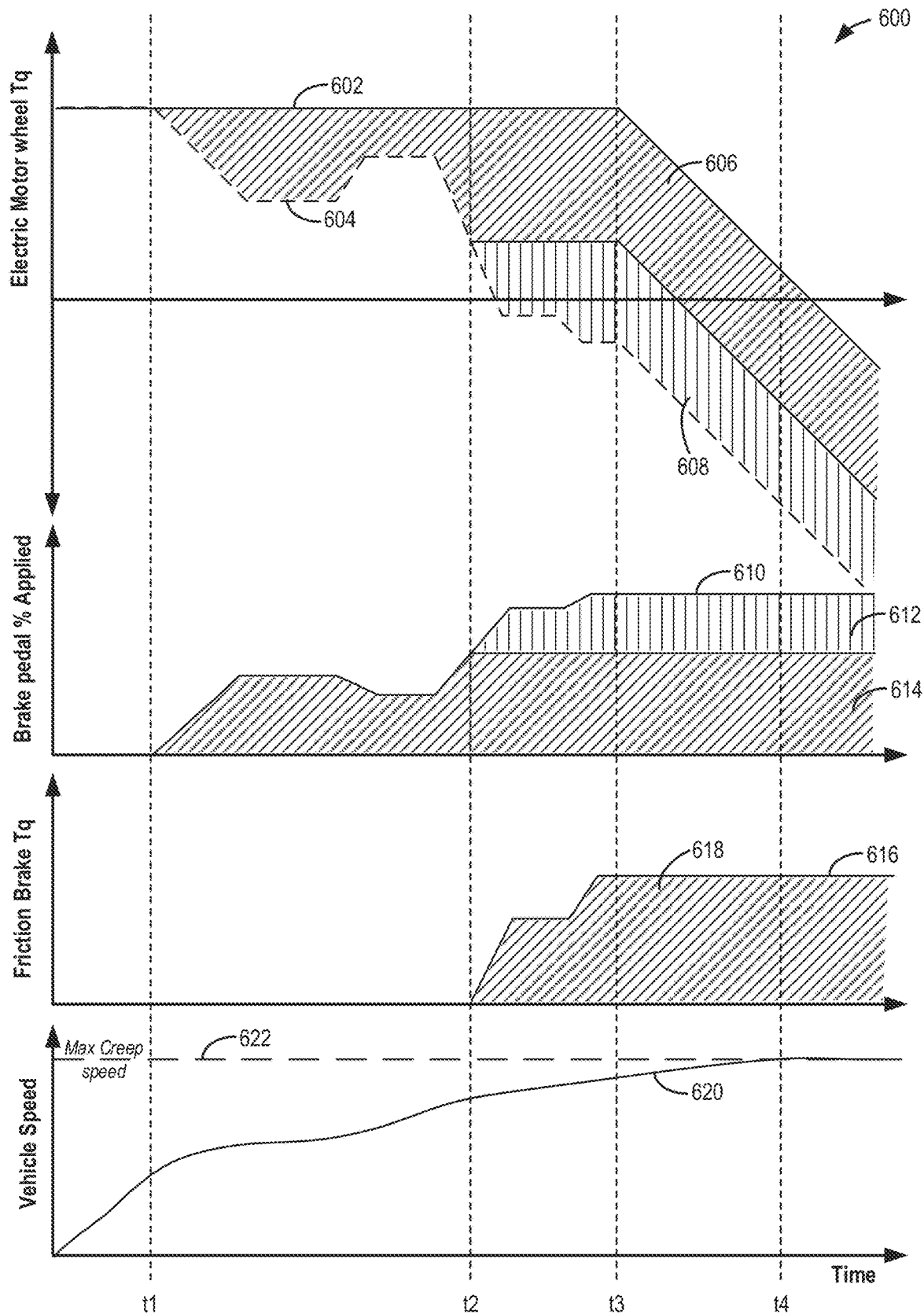
FIG. 6 depicts an example interaction between brake pedal position and electric motor torque in an electric-only vehicle operating in a virtual 4×4 Low mode.

Map 600 of FIG. 6 shows an example interaction between brake pedal position and motor torque while in a virtual "4×4 Low" mode to allow brake-pedal only driving in an electric vehicle. Electric motor wheel torque is shown at plots 602, 604. Brake pedal application is shown at plot 610. Friction brake torque is depicted at plot 616. Vehicle speed is shown at plot 620. Plot 602 shows the total wheel torque (Inventors: please confirm if this is total wheel torque or total motor torque or total brake torque) requested by the system when the brake and accelerator pedal are not applied. Brake pedal travel is interpreted as a negative torque request that subtracts wheel torque from the total wheel torque (plot 602) to create a total driver requested wheel torque shown at plot 604. Area 608 (filled with straight lines) represents the friction brake's contribution to achieving the brake pedal's negative torque request. Area 606 (filled with diagonal lines) represents the motor's contribution to achieving the brake pedal's negative torque request. Using a reduction in motor torque, while still maintaining some positive torque for driveline management, enables the brake pedal request to be achieved most efficiently because less energy is lost in the form of braking heat.

Plot 600 depicts brake pedal application at plot 610. Plot 614 indicates the portion of the brake pedal travel that is translated into a reduction in traction motor torque to reduce vehicle acceleration, which is most efficient and desirable way to slow the vehicle down. Plot 612 indicates the portion of the brake pedal travel that is translated into friction brake torque application to slow the vehicle down by transforming kinetic energy into heat. When the brake pedal is released, the motor provides the full electric motor torque to accelerate the vehicle. At time t1, the brake pedal is applied to reduce vehicle acceleration. Instead of applying the friction brakes and wasting some electric energy, the motor torque is instead reduced so that the net powertrain at the wheels is equivalent to full motor torque with the brakes applied. However, we always want to maintain a minimum amount of positive torque the wheels while in virtual 4×4 Low mode to keep the driveline twisted and on the positive side of lash. So at time t2, when the brake pedal is applied more, the motor is reduced to the minimum allowed positive torque and friction brakes are applied (plot 616) so that the friction brake torque (area 618) can make up the difference between motor torque and the desired total wheel torque. At time t3, the vehicle is approaching the maximum creep speed 622, so the motor creep torque curve starts to decrease towards zero. The actual electric motor torque at the wheels follows this decrease to achieve the decrease in total wheel torque without changing friction brake torque. This provides the most efficient option for creep speed control. However, this approach gives up driveline management benefits related to keeping positive torque from the motor during this speed range.

Figure 7:
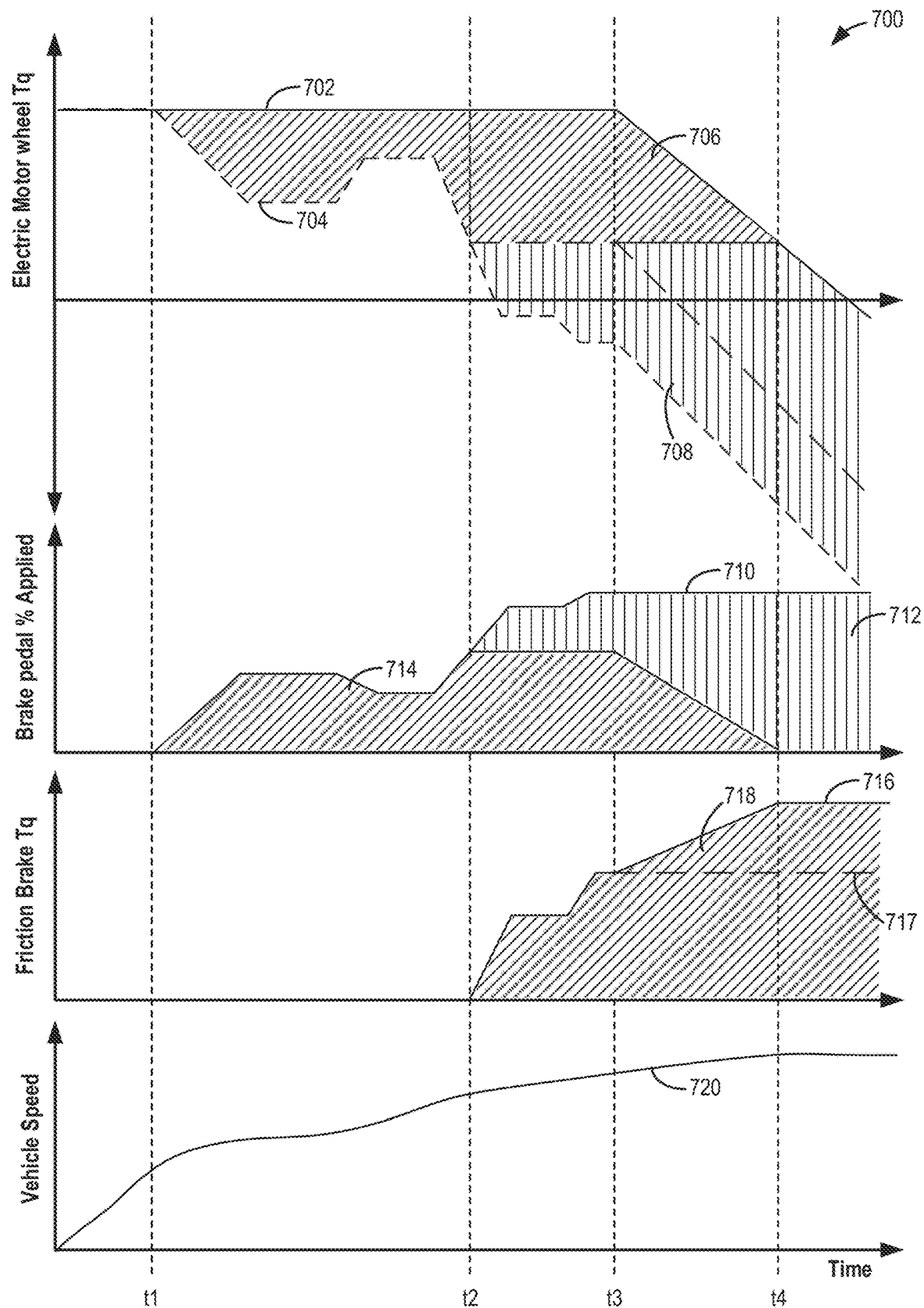
FIG. 7 depicts another example interaction between brake pedal position and electric motor torque in an electric-only vehicle operating in a virtual 4×4 Low mode.

Another example interaction between friction brake torque and motor torque at or around maximum creep speed while in a virtual "4×4 Low" mode is shown at FIG. 7. The approach enables brake-pedal only driving in an electric vehicle. Like map 600, map 700 depicts electric motor wheel torque is at plots 702, 704. Brake pedal application is shown at plot 710. Friction brake torque is depicted at plot 716. Vehicle speed is shown at plot 720.

In this example, a greater amount of friction brake torque is used by the powertrain to reach the creep speed, as indicated by area 708 (relative to area 608), area 712 (as compared to area 612), and area 718 (as compared to area 618). In the depicted approach, electric motor torque continues to hold the minimum positive motor torque value as long as possible and instead delivers more decrease in total wheel torque with an increase friction brake negative torque. This trades energy wasted to braking heat for better management of the driveline. At time t4, the creep torque curve begins to decrease below the minimum driveline management motor torque value to regulate the maximum creep speed. Because the controller does not want the motor to produce more than this amount of torque if the driver were to quickly release the brake pedal, motor torque follows the creep curve down to negative values. In comparison, in a conventional engine driven vehicle, applying the brake pedal reduces the equilibrium speed during creep. Thus, motor torque 706 is decreased down to minimum positive value by t2 as the brake pedal is applied. This minimum electric torque is held until t4, when the total creep torque curve begins to decrease below the minimum motor torque value to regulate the maximum creep speed.

In conventional 4WD vehicles, torque is split between the front and rear axles according to the type of transfer case used. If the transfer case is a mechanical locking mechanism, the front and rear differentials spin at the same speed, but can have different torque applied. If the transfer case is a differential or slipping clutch, the front and rear axles can spin at different speeds and can receive different amounts of torque. With the 4WD electric drivetrain described herein, any of these conventional behaviors can be replicated during virtual 4×4 Low operation. For example, the controller may distribute the elevated creep torque command equally to both the front and rear axles. As another example, the controller may split torque according to which tire has more traction. This may be determined by measuring vehicle incline/acceleration or wheel slip.

For example, with reference to position A of FIG. 3, the front axle will momentarily have very little traction as it slides down the grade. At this moment, it would be desirable to have the rear axle produce more torque since it has more traction to regulate vehicle speed. If the vehicle were on a steep, downhill grade, the controller may choose to apply more torque to the front axle because of its greater normal force. Applying more torque to a single motor has the advantage of allowing the opposite wheels to be less likely to slip (that is, reduced propulsion torque) and provide greater stability as well as a better estimate of ground speed. Applying more torque to the rear motor allows the front tires to have more traction for steering on slippery surfaces since less traction will be used in the longitudinal direction.

Figure 8:
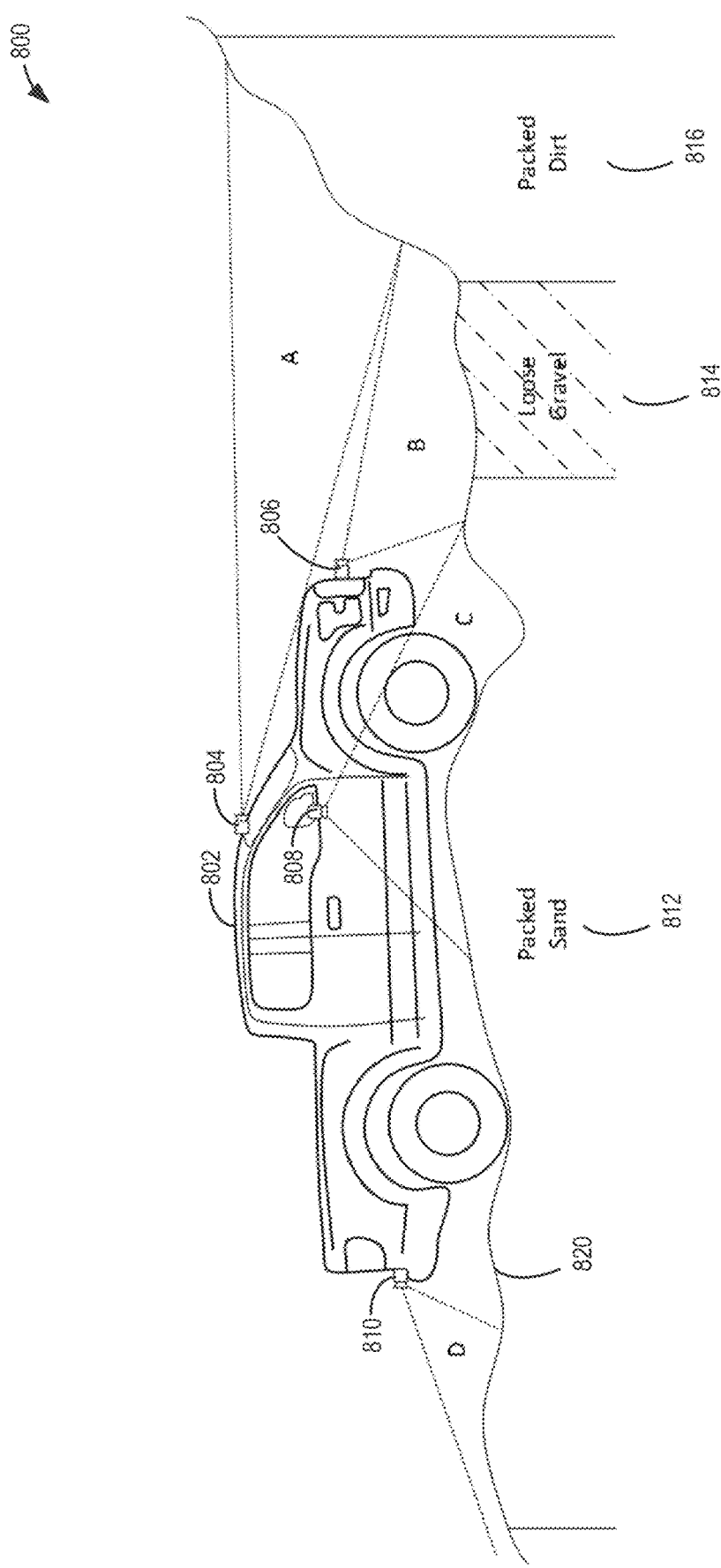
FIG. 8 depicts use of various vehicle cameras, radars, and/or sensors to automatically detect an upcoming terrain and change a creep torque profile in accordance.

Turning now to FIG. 8, an example embodiment 800 is shown for using a vehicle's sensors, camera, and radar suite to automatically detect an upcoming terrain and select a motor creep torque profile appropriately while operating an electric powertrain of a vehicle in a 4×4 Low mode. Further, the creep torque profile can be dynamically adjusted, in real-time, with changing terrain conditions.

In the depicted example, vehicle 802 has a sensor suite that includes four on-board camera sensors, the camera sensors used to sense the terrain 820 on which the vehicle is traveling. Camera 804 senses the upcoming terrain in region A and uses it as preview. Camera 804 is positioned on a top region of the windshield of the vehicle and configured to face forward. Camera 806 senses the terrain that is directly in front of the vehicle and uses this information to process the upcoming terrain in region B. Camera 806 is mounted on a front of the vehicle, such as mounted on a front grille, and configured to face forward. Camera 808 senses the terrain that the front axle is currently driving over in region C. Camera 808 is mounted on a side view mirror and is configured to face downwards. Camera 810 senses the terrain behind the vehicle, in region D. Camera 810 is mounted on a back side of the vehicle, such as mounted on a rear bumper, and is configured to face backwards.

The sensing data from the four cameras 804-810 can be fused with data from a navigation system of the vehicle, including GPS data, ambient temperature, and local weather data, to obtain an estimate of the upcoming terrain. For example, the data may be processed using artificial intelligence and/or cloud computing. The processed data is then used to dynamically modify the creep torque in order to maximize traction on the upcoming terrain. In this way, the driver experiences a seamless driving experience where they only have to apply minimal effort to drive the vehicle on the rough terrain without having to manually change terrain modes. This auto terrain sensing feature would only be active when the vehicle is operating in the 4×4 Low mode and the driver has engaged the auto terrain sensing feature.

In the example shown in FIG. 8, Camera 804 would have initially sensed that there is a patch of loose gravel at the base of the upcoming hill thus priming Camera 806 to start processing the data. Once Camera 806 can see patch of loose gravel 814, it would start to analyze the images to determine the terrain. Once it has determined the terrain, it will start the creep torque blending process to start blending in the appropriate amount of creep torque for that surface. Camera 808 is then used as feedback to the controller to determine when to blend out of the new terrain surface. The data collected by Camera 808 and the wheel response of the front axle is used as preview for control of the rear axle. Finally, data from Cameras 802 and 810 can be used as a way to detect the incline angle of the vehicle relative to the horizon.

In this way, by using cameras for terrain detection and/or determine wheel slip, traction and driver assist can be better provided by using the electric motors of an electric vehicle operating in a 4×4 mode. The technical effect of increasing wheel torque command for an electric vehicle based on selection of a 4WD vehicle mode is that off-road driving capability can be improved by simulating the effect of a low range gear box at low vehicle speeds, without necessitating the associated hardware. As a result, a 4×4 capability is provided in an electric vehicle with a single gear reduction.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

One example method comprises: while operating an electric-only vehicle in a low range mode, increasing a creep torque command to one or more electric motors at a given vehicle speed and pedal position relative to a default creep torque commanded when operating the vehicle outside the low range mode; and adjusting a wheel torque command while operating in the low range mode based on at least one of vehicle terrain data and vehicle speed. In the preceding example, additionally or optionally, the one or more electric motors include a front motor coupled to front wheels of the vehicle and a rear motor coupled to rear wheels of the vehicle and wherein adjusting the creep torque command includes adjusting a torque split commanded to the front motor relative to the rear motor. In any or all of the preceding examples, additionally or optionally, adjusting the creep torque command includes adjusting a maximum creep torque for a given terrain. In any or all of the preceding examples, additionally or optionally, adjusting the creep torque command includes adjusting a peak creep speed at which creep wheel torque crosses a lash zone from a positive to a negative value. In any or all of the preceding examples, additionally or optionally, the method further comprises inferring the vehicle terrain data based on input from a sensor suite of the vehicle, the sensor suite including one or more sensors, cameras, and radars coupled to multiple locations of a body of the vehicle. In any or all of the preceding examples, additionally or optionally, the inferring of the vehicle terrain data is further based on input from a vehicle navigation system. In any or all of the preceding examples, additionally or optionally, the vehicle speed is inferred based on driver brake pedal input, the wheel torque commanded to the one or more electric motors increased responsive to reduction of brake pedal input, the wheel torque commanded to the one or more electric motors decreased responsive to increase in brake pedal input. In any or all of the preceding examples, additionally or optionally, increasing the wheel torque command includes selecting one of a plurality of low range creep wheel torque profiles based at least on the vehicle terrain data, each of the plurality of creep wheel torque profiles including a mapped function between commanded creep torque and each of accelerator pedal position and vehicle speed. In any or all of the preceding examples, additionally or optionally, the method further comprises operating the electric-only vehicle in the low range mode responsive to operator input indicative of entry into the low range mode. In any or all of the preceding examples, additionally or optionally, the method further comprises, responsive to operator input indicative of exit from the low range mode, decreasing the creep torque command to the one or more electric motors and adjusting the creep torque commanded while operating out of the low range mode in accordance with the default creep wheel torque profile having a smaller mapped function between the commanded creep torque and each of the accelerator pedal position and vehicle speed as compared to each of the plurality of low range creep wheel torque profiles. In any or all of the preceding examples, additionally or optionally, the method further comprises transitioning from one of the plurality of low range creep wheel torque profiles to the default creep wheel torque profile via a blending function.

Another example method for an electric-only vehicle, comprises, while operating in a four wheel drive mode, increasing a creep wheel torque commanded to one or more electric motors as a function of vehicle terrain, the increasing relative to a default creep wheel torque; estimating target wheel torque as a first function of brake pedal input and vehicle speed; and adjusting a ratio of friction brake torque relative to motor torque applied to vehicle wheels to provide the target wheel torque. In any or all of the preceding examples, additionally or optionally, the method further comprises, while operating out of the four wheel drive mode, decreasing the creep wheel torque commanded to the one or more electric motors to the default creep wheel torque; estimating the target wheel torque as a second, different function of brake pedal input and vehicle speed; and adjusting the ratio of friction brake torque relative to motor torque to provide the target wheel torque, wherein the second function includes a smaller gain relative to the first function. In any or all of the preceding examples, additionally or optionally, the one or more electric motors include a front motor and a rear motor, and wherein increasing the creep wheel torque commanded includes adjusting a motor torque split commanded between the front motor and the rear motor, the adjusting based on a traction limit of the vehicle while on the terrain. In any or all of the preceding examples, additionally or optionally, the operating in the four wheel drive mode is responsive to operator input, and wherein the vehicle terrain is inferred via via one or more of sensors, cameras, and radars coupled to the vehicle, the operator input, and navigational input from a vehicle navigation system.

An example vehicle system comprises: vehicle wheels; an electric motor coupled to the vehicle wheels via a single gear reduction; a sensor suite including sensors, cameras, and radars; an operator interface with a first button for selecting a default mode of vehicle operation and a second button for selecting a low range mode of vehicle operation; and a controller with computer readable instructions stored on non-transitory memory that when executed cause the controller to: operate the vehicle in the default mode responsive to actuation of the first button including, when vehicle speed is less than a threshold, commanding the electric motor to deliver a first creep wheel torque, and when vehicle speed is above the threshold, commanding the electric motor to deliver moving wheel torque as a first mapped function of driver pedal input; and operate the vehicle in the low range mode responsive to actuation of the second button including, when vehicle speed is less than the threshold, commanding the electric motor to deliver a second creep wheel torque, higher than the first creep wheel torque, and when vehicle speed is above the threshold, commanding the electric motor to deliver moving wheel torque as a second mapped function of driver pedal input, the second mapped function having a higher gain than the first function. In any or all of the preceding examples, additionally or optionally, the controller includes further instructions to increase the second creep wheel torque relative to the first creep wheel torque as a function of vehicle terrain, as inferred via input from the sensor suite. In any or all of the preceding examples, additionally or optionally, the second creep wheel torque is increased further relative to the first creep wheel torque when the vehicle terrain includes gravel than when the vehicle terrain includes snow. In any or all of the preceding examples, additionally or optionally, the controller includes further instructions to transition from the low range mode to the default mode by commanding the electric motor to deliver moving wheel torque as a blended function of the driver pedal input, the blended function blended between the first and the second mapped function. In any or all of the preceding examples, additionally or optionally, the first mapped function includes a higher ratio of friction brake torque from wheel brakes relative to motor torque from the electric motor relative to the second mapped function.

In another representation, while operating a hybrid electric vehicle in an electric mode, with vehicle wheels being propelled using motor torque, responsive to operator selection of an electric 4×4 low range mode, increasing a creep torque command to one or more electric motors at a given vehicle speed and pedal position relative to a default creep torque commanded when operating the vehicle in a default electric mode; and adjusting a wheel torque command while operating in the electric 4×4 low range mode based on at least one of vehicle terrain data and vehicle speed.

In a further representation, a method for a hybrid electric vehicle comprises, while propelling the vehicle using motor torque, and responsive to an operator request for operating the vehicle in a four wheel drive mode, increasing a creep wheel torque commanded to one or more electric motors as a function of vehicle terrain, the increasing relative to a default creep wheel torque applied when propelling the vehicle using motor torque outside the four wheel drive mode; estimating target wheel torque as a first function of brake pedal input and vehicle speed; and adjusting a ratio of friction brake torque relative to motor torque applied to vehicle wheels to provide the target wheel torque.

In a still further representation, a vehicle system comprises: vehicle wheels; an engine coupled to the wheels via a torque converter, a transmission, and an additional low range gearbox; an electric motor coupled to the vehicle wheels via a single gear reduction; a sensor suite including sensors, cameras, and radars; an operator interface with a first button for selecting an engine or electric default mode of vehicle operation and a second button for selecting an engine or electric 4×4 low range mode of vehicle operation; and a controller with computer readable instructions stored on non-transitory memory that when executed cause the controller to: while propelling the vehicle using engine torque, operate the vehicle in the engine default mode responsive to actuation of the first button including, decoupling the additional low range gear box from a driveline coupling the engine to the wheels and operating the engine with a first idling speed to deliver a first creep wheel torque when vehicle speed is less than a threshold; and operate the vehicle in the electric low range mode responsive to actuation of the second button including, coupling the additional low range gear box to the driveline via a clutch and operating the engine with a second idling speed, raised relative to the first idling speed to deliver a second creep wheel torque, higher than the first creep wheel torque. The controller may include further instructions that when executed cause the controller to, while propelling the vehicle using motor torque, operate the vehicle in the electric default mode responsive to actuation of the first button including, when vehicle speed is less than the threshold, commanding the electric motor to deliver a first creep wheel torque, and when vehicle speed is above the threshold, commanding the electric motor to deliver moving wheel torque as a first mapped function of driver pedal input; and operate the vehicle in the electric low range mode responsive to actuation of the second button including, when vehicle speed is less than the threshold, commanding the electric motor to deliver a second creep wheel torque, higher than the first creep wheel torque, and when vehicle speed is above the threshold, commanding the electric motor to deliver moving wheel torque as a second mapped function of driver pedal input, the second mapped function having a higher gain than the first function.

The invention claimed is:

1. A method comprising:
    while operating an electric-only vehicle in a low range mode, increasing a creep torque command to one or more electric motors at a given vehicle speed and pedal position relative to a default creep torque commanded when operating the vehicle outside the low range mode; and
    adjusting a wheel torque command while operating in the low range mode based on at least one of vehicle terrain data and vehicle speed.

2. The method of claim 1, wherein the one or more electric motors include a front motor coupled to front wheels of the vehicle and a rear motor coupled to rear wheels of the vehicle and wherein adjusting the creep torque command includes adjusting a torque split commanded to the front motor relative to the rear motor.

3. The method of claim 1, wherein adjusting the creep torque command includes adjusting a maximum creep torque for a given terrain.

4. The method of claim 1, wherein adjusting the creep torque command includes adjusting a peak creep speed at which creep wheel torque crosses a lash zone from a positive to a negative value.

5. The method of claim 1, further comprising, inferring the vehicle terrain data based on input from a sensor suite of the vehicle, the sensor suite including one or more sensors, cameras, and radars coupled to multiple locations of a body of the vehicle.

6. The method of claim 1, wherein the inferring of the vehicle terrain data is further based on input from a vehicle navigation system.

7. The method of claim 1, wherein the vehicle speed is inferred based on driver brake pedal input, the wheel torque commanded to the one or more electric motors increased responsive to reduction of brake pedal input, the wheel torque commanded to the one or more electric motors decreased responsive to increase in brake pedal input.

8. The method of claim 1, wherein increasing the wheel torque command includes selecting one of a plurality of low range creep wheel torque profiles based at least on the vehicle terrain data, each of the plurality of creep wheel torque profiles including a mapped function between commanded creep torque and each of accelerator pedal position and vehicle speed.

9. The method of claim 8, further comprising, operating the electric-only vehicle in the low range mode responsive to operator input indicative of entry into the low range mode.

10. The method of claim 9, further comprising, responsive to operator input indicative of exit from the low range mode, decreasing the creep torque command to the one or more electric motors and adjusting the creep torque commanded while operating out of the low range mode in accordance with the default creep wheel torque profile having a smaller mapped function between the commanded creep torque and each of the accelerator pedal position and vehicle speed as compared to each of the plurality of low range creep wheel torque profiles.

11. The method of claim 10, further comprising, transitioning from one of the plurality of low range creep wheel torque profiles to the default creep wheel torque profile via a blending function.

12. A method for an electric-only vehicle, comprising:
while operating in a four wheel drive mode,
increasing a creep wheel torque commanded to one or more electric motors as a function of vehicle terrain, the increasing relative to a default creep wheel torque;
estimating target wheel torque as a first function of brake pedal input and vehicle speed; and
adjusting a ratio of friction brake torque relative to motor torque applied to vehicle wheels to provide the target wheel torque.

13. The method of claim 12, further comprising, while operating out of the four wheel drive mode, decreasing the creep wheel torque commanded to the one or more electric motors to the default creep wheel torque; estimating the target wheel torque as a second, different function of brake pedal input and vehicle speed; and adjusting the ratio of friction brake torque relative to motor torque to provide the target wheel torque, wherein the second function includes a smaller gain relative to the first function.

14. The method of claim 12, wherein the one or more electric motors include a front motor and a rear motor, and wherein increasing the creep wheel torque commanded includes adjusting a motor torque split commanded between the front motor and the rear motor, the adjusting based on a traction limit of the vehicle while on the terrain.

15. The method of claim 12, wherein the operating in the four wheel drive mode is responsive to operator input, and wherein the vehicle terrain is inferred via via one or more of sensors, cameras, and radars coupled to the vehicle, the operator input, and navigational input from a vehicle navigation system.

16. A vehicle system, comprising:
vehicle wheels;
an electric motor coupled to the vehicle wheels via a single gear reduction;
a sensor suite including sensors, cameras, and radars;
an operator interface with a first button for selecting a default mode of vehicle operation and a second button for selecting a low range mode of vehicle operation; and
a controller with computer readable instructions stored on non-transitory memory that when executed cause the controller to:
operate the vehicle in the default mode responsive to actuation of the first button including, when vehicle speed is less than a threshold, commanding the electric motor to deliver a first creep wheel torque, and when vehicle speed is above the threshold, commanding the electric motor to deliver moving wheel torque as a first mapped function of driver pedal input; and
operate the vehicle in the low range mode responsive to actuation of the second button including, when vehicle speed is less than the threshold, commanding the electric motor to deliver a second creep wheel torque, higher than the first creep wheel torque, and when vehicle speed is above the threshold, commanding the electric motor to deliver moving wheel torque as a second mapped function of driver pedal input, the second mapped function having a higher gain than the first function.

17. The system of claim 16, wherein the controller includes further instructions to increase the second creep wheel torque relative to the first creep wheel torque as a function of vehicle terrain, as inferred via input from the sensor suite.

18. The system of claim 17, wherein the second creep wheel torque is increased further relative to the first creep wheel torque when the vehicle terrain includes gravel than when the vehicle terrain includes snow.

19. The system of claim 16, wherein the controller includes further instructions to:
transition from the low range mode to the default mode by commanding the electric motor to deliver moving wheel torque as a blended function of the driver pedal input, the blended function blended between the first and the second mapped function.

20. The system of claim 16, wherein the first mapped function includes a higher ratio of friction brake torque from wheel brakes relative to motor torque from the electric motor relative to the second mapped function.

* * * * *